(12) United States Patent
Tierling et al.

(10) Patent No.: US 7,791,588 B2
(45) Date of Patent: Sep. 7, 2010

(54) SYSTEM AND METHOD FOR MAPPING INSTRUCTIONS ASSOCIATED WITH HAPTIC FEEDBACK

(75) Inventors: Kollin M. Tierling, Milpitas, CA (US); Juan Manuel Cruz-Hernandez, Montreal (CA); Alex S. Goldenberg, San Francisco, CA (US); Danny A. Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 1022 days.

(21) Appl. No.: 11/001,190

(22) Filed: Dec. 2, 2004

(65) Prior Publication Data

US 2005/0134561 A1    Jun. 23, 2005

Related U.S. Application Data

(60) Provisional application No. 60/530,980, filed on Dec. 22, 2003.

(51) Int. Cl.
*G09G 5/00* (2006.01)
(52) U.S. Cl. .................. 345/156; 345/204; 455/567
(58) Field of Classification Search ......... 345/156–158, 345/173, 204, 419, 702; 340/407.1; 455/567
See application file for complete search history.

(56) References Cited

U.S. PATENT DOCUMENTS

| | | | |
|---|---|---|---|
| 5,103,404 A | 4/1992 | McIntosh | |
| 5,691,898 A | 11/1997 | Rosenberg et al. | |
| 5,709,219 A | 1/1998 | Chen et al. | |
| 5,731,804 A | 3/1998 | Rosenberg | |
| 5,844,392 A | 12/1998 | Peurach et al. | |
| 5,952,806 A | 9/1999 | Muramatsu | |
| 5,959,613 A | 9/1999 | Rosenberg et al. | |
| 5,973,670 A | 10/1999 | Barber et al. | |
| 6,020,876 A | 2/2000 | Rosenberg et al. | |
| 6,028,593 A | 2/2000 | Rosenberg et al. | |
| 6,036,495 A | 3/2000 | Marcus et al. | |
| 6,046,726 A | 4/2000 | Keyson | |
| 6,071,194 A | 6/2000 | Sanderson et al. | |
| 6,111,577 A | 8/2000 | Zilles et al. | |
| 6,128,006 A | 10/2000 | Rosenberg et al. | |
| 6,147,674 A | 11/2000 | Rosenberg et al. | |
| 6,161,126 A | 12/2000 | Wies et al. | |

(Continued)

OTHER PUBLICATIONS

Iwata, Hiroo, "Artificial Reality With Force-Feedback: Development of Desktop Virtual Space With Compact Master Manipulator," Computer Graphics, vol. 24, No. 4, Aug. 1990, pp. 165-170.

(Continued)

*Primary Examiner*—Kimnhung Nguyen
(74) *Attorney, Agent, or Firm*—Squire, Sanders & Dempsey, LLP

(57) ABSTRACT

An embodiment of the invention provides a system and method for mapping instructions associated with haptic feedback. An apparatus having a controller including an effect mapper is disclosed. The controller is configured to receive effect instructions from at least one application. The effect mapper is in communication with the controller, and is configured to produce multiple haptic instructions in response to at least a portion of the received effect instructions. The haptic instructions are at least partially based on a physical characteristic of a haptic device.

74 Claims, 12 Drawing Sheets

U.S. PATENT DOCUMENTS

| | | | |
|---|---|---|---|
| 6,169,540 | B1 | 1/2001 | Rosenberg et al. |
| 6,219,032 | B1 | 4/2001 | Rosenberg et al. |
| 6,219,034 | B1 | 4/2001 | Elbing et al. |
| 6,252,579 | B1 | 6/2001 | Rosenberg et al. |
| 6,252,583 | B1 | 6/2001 | Braun et al. |
| 6,292,170 | B1 | 9/2001 | Chang et al. |
| 6,411,276 | B1 | 6/2002 | Braun et al. |
| 6,433,771 | B1 | 8/2002 | Yocum et al. |
| 6,859,819 | B1 | 2/2005 | Rosenberg et al. |
| 7,202,851 | B2 * | 4/2007 | Cunningham et al. ....... 345/156 |
| 2003/0067440 | A1 * | 4/2003 | Rank .......................... 345/156 |
| 2004/0056840 | A1 * | 3/2004 | Goldenberg et al. ........ 345/156 |
| 2004/0145600 | A1 * | 7/2004 | Cruz-Hernandez et al. .. 345/702 |

OTHER PUBLICATIONS

Kelley, A.J. et al., "On the Development of a Force-Feedback Mouse and Its Integration into a Graphical User Interface," DSC-vol. 55-1, Dynamic Systems and Control, vol. 1, ASME 1994, pp. 287-294.

* cited by examiner

|   | α | ψ | ω | φ | τ | δ | n |
|---|---|---|---|---|---|---|---|
| α | $i_{\alpha\alpha}$ | $i_{\alpha\psi}$ | $i_{\alpha\omega}$ | $i_{\alpha\phi}$ | $i_{\alpha\tau}$ | $i_{\alpha\delta}$ | $i_{\alpha n}$ |
| ψ | $i_{\psi\alpha}$ | $i_{\psi\psi}$ | $i_{\psi\omega}$ | $i_{\psi\phi}$ | $i_{\psi\tau}$ | $i_{\psi\delta}$ | $i_{\psi n}$ |
| ω | $i_{\omega\alpha}$ | $i_{\omega\psi}$ | $i_{\omega\omega}$ | $i_{\omega\phi}$ | $i_{\omega\tau}$ | $i_{\omega\delta}$ | $i_{\omega n}$ |
| φ | $i_{\phi\alpha}$ | $i_{\phi\psi}$ | $i_{\phi\omega}$ | $i_{\phi\phi}$ | $i_{\phi\tau}$ | $i_{\phi\delta}$ | $i_{\phi n}$ |
| τ | $i_{\tau\alpha}$ | $i_{\tau\psi}$ | $i_{\tau\omega}$ | $i_{\tau\phi}$ | $i_{\tau\tau}$ | $i_{\tau\delta}$ | $i_{\tau n}$ |
| δ | $i_{\delta\alpha}$ | $i_{\delta\psi}$ | $i_{\delta\omega}$ | $i_{\delta\phi}$ | $i_{\delta\tau}$ | $i_{\delta\delta}$ | $i_{\delta n}$ |
| n | $i_{n\alpha}$ | $i_{n\psi}$ | $i_{n\omega}$ | $i_{n\phi}$ | $i_{n\tau}$ | $i_{n\delta}$ | $i_{nn}$ |
|   | $i_\alpha$ | $i_\psi$ | $i_\omega$ | $i_\phi$ | $i_\tau$ | $i_\delta$ | $i_n$ |

*Fig. 4*

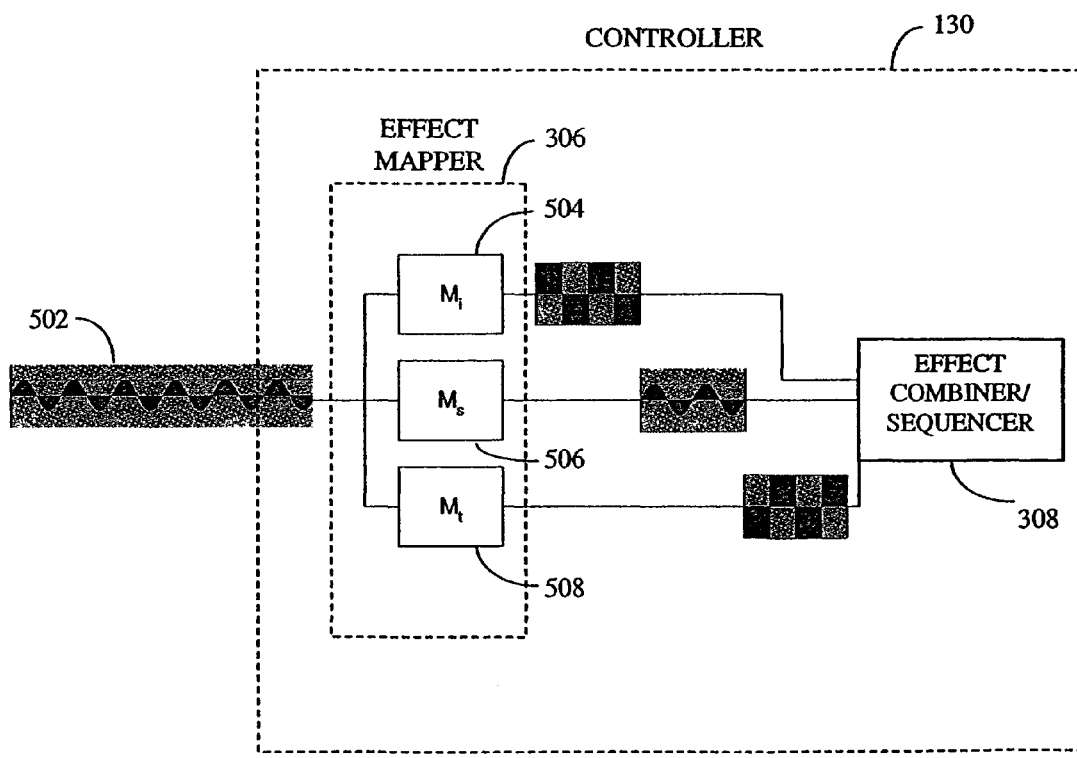

*Fig. 5*

|   | α | ψ | ω | φ | τ | δ | n |
|---|---|---|---|---|---|---|---|
| α | 2 | 0 | 0 | 0 | 0 | 0 | 0 |
| ψ | 0 | 0 | 0 | 0 | 0 | 0 | 0 |
| ω | 0 | 0 | 1 | 0 | 2 | 0 | 0 |
| φ | 0 | 0 | 0 | 1 | 0 | 0 | 0 |
| τ | 0 | 0 | 0 | 0 | 0 | 0 | 0 |
| δ | 0 | 0 | 0 | 0 | 0 | 1 | 0 |
| n | 0 | 0 | 0 | 0 | 0 | 0 | 1 |
|   | 0 | 1 | 0 | 0 | 0 | 0 | 0 |

*Fig. 6A*

|   | α | ψ | ω | φ | τ | δ | n |
|---|---|---|---|---|---|---|---|
| α | 1 | 0 | 0 | 0 | 0 | 0 | 0 |
| ψ | 0 | 1 | 0 | 0 | 0 | 0 | 0 |
| ω | 0 | 0 | 1 | 0 | -4 | -2 | 0 |
| φ | 0 | 0 | 0 | 1 | 0 | 0 | 0 |
| τ | 0 | 0 | 0 | 0 | 1 | 0 | 0 |
| δ | 0 | 0 | 0 | 0 | 0 | 1 | 0 |
| n | 0 | 0 | 0 | 0 | 0 | 0 | 1 |
|   | 0 | 0 | 0 | 0 | 0 | 0 | 0 |

*Fig. 6B*

|   | α | ψ | ω | φ | τ | δ | n |
|---|---|---|---|---|---|---|---|
| α | 2 | 0 | 0 | 0 | 0 | 0 | 0 |
| ψ | 0 | 0 | 0 | 0 | 0 | 0 | 0 |
| ω | 0 | 0 | 1 | 0 | 2 | -2 | 0 |
| φ | 0 | 0 | 0 | -1 | 0 | 0 | 0 |
| τ | 0 | 0 | 0 | 0 | 0 | 1 | 0 |
| δ | 0 | 0 | 0 | 0 | 0 | 1 | 0 |
| n | 0 | 0 | 0 | 0 | 0 | 0 | 1 |
|   | 0 | 1 | 0 | 0 | 0 | 0 | 0 |

*Fig. 6C*

|   | α | ψ | ω | φ | τ | δ | n |
|---|---|---|---|---|---|---|---|
| α | 1 | 0 | 0 | 0 | 0 | 0 | 0 |
| ψ | 0 | 0 | 0 | 0 | 0 | 0 | 0 |
| ω | 0 | 0 | 0 | 0 | 0 | 0 | 0 |
| φ | 0 | 0 | 0 | 1 | 0 | 0 | 0 |
| τ | 0 | 0 | 0 | 0 | 1 | 0 | 0 |
| δ | 0 | 0 | 0 | 0 | 0 | 1 | 0 |
| n | 0 | 0 | 0 | 0 | 0 | 0 | 1 |
|   | 0 | sin | $\omega_r$ | 0 | 0 | 0 | 0 |

*Fig. 7*

|   | α | ψ | ω | φ | τ | δ | n |
|---|---|---|---|---|---|---|---|
| α | 1 | 0 | 0 | 0 | 0 | 0 | 0 |
| ψ | 0 | 1 | 0 | 0 | 0 | 0 | 0 |
| ω | 0 | 0 | 0 | 0 | 0 | 1 | $1/\omega_r$ |
| φ | 0 | 0 | 0 | 1 | 0 | 0 | 0 |
| τ | 0 | 0 | 0 | 0 | 0 | 0 | 0 |
| δ | 0 | 0 | 0 | 0 | 0 | 0 | 0 |
| n | 0 | 0 | 0 | 0 | 0 | 0 | 0 |
|   | 0 | 0 | $\omega_r$ | 0 | $4\lambda_r$ | $-4\lambda_r$ | 0 |

*Fig. 8*

|   | α | ψ | ω | φ | τ | δ | n |
|---|---|---|---|---|---|---|---|
| α | -½ | 0 | 0 | 0 | 0 | 0 | 0 |
| ψ | 0 | 1 | 0 | 0 | 0 | 0 | 0 |
| ω | 0 | 0 | 1 | 0 | 0 | 0 | 0 |
| φ | 0 | 0 | 0 | 1 | 0 | 0 | 0 |
| τ | 0 | 0 | 0 | 0 | 1 | 0 | 0 |
| δ | 0 | 0 | 0 | 0 | 0 | 1 | 0 |
| n | 0 | 0 | 0 | 0 | 0 | 0 | 1 |
|   |   |   |   | π/2 |   |   |   |

*Fig. 11B*

|   | α | ψ | ω | φ | τ | δ | n |
|---|---|---|---|---|---|---|---|
| α | ½ | 0 | 0 | 0 | 0 | 0 | 0 |
| ψ | 0 | 1 | 0 | 0 | 0 | 0 | 0 |
| ω | 0 | 0 | 1 | 0 | 0 | 0 | 0 |
| φ | 0 | 0 | 0 | 1 | 0 | 0 | 0 |
| τ | 0 | 0 | 0 | 0 | 1 | 0 | 0 |
| δ | 0 | 0 | 0 | 0 | 0 | 1 | 0 |
| n | 0 | 0 | 0 | 0 | 0 | 0 | 1 |
|   |   |   |   | π/2 |   |   |   |

*Fig. 11A*

|   | $\alpha$ | $\psi$ | $\omega$ | $\phi$ | $\tau$ | $\delta$ | $n$ |
|---|---|---|---|---|---|---|---|
| $\alpha$ | 1 | 0 | 0 | 0 | 0 | 0 | 0 |
| $\psi$ | 0 | 0 | 0 | 0 | 0 | 0 | 0 |
| $\omega$ | 0 | 0 | 0 | $\pi/2\omega_r$ | 0 | 0 | 0 |
| $\phi$ | 0 | 0 | 0 | 0 | 0 | 0 | 0 |
| $\tau$ | 0 | 0 | 0 | 0 | 1 | 0 | 0 |
| $\delta$ | 0 | 0 | 0 | 0 | 0 | 1 | 0 |
| $n$ | 0 | 0 | 0 | 0 | 0 | 0 | 1 |
|  | 0 | 1 | $\infty$ | $\pi/2$ | 0 | 0 | 0 | ns of the invention relate to mapping instructions associated with haptic feedback.
SYSTEM AND METHOD FOR MAPPING INSTRUCTIONS ASSOCIATED WITH HAPTIC FEEDBACK

CROSS-REFERENCE TO RELATED APPLICATION

This application claims the benefit under 35 U.S.C. 119(e) of U.S. Provisional Application Ser. No. 60/530,980, entitled "System and Method for Mapping Instructions Associated with Haptic Feedback," filed Dec. 22, 2003, which is incorporated herein by reference in its entirety.

BACKGROUND

Systems and methods of the invention relate generally to mapping instructions associated with haptic feedback. More specifically, systems and methods of the invention relate to mapping drive signals to haptic sensations.

Computer users often use interface devices to provide information to a computers or other electronic devices. For example, with such interface devices, a user can interact with an environment displayed by a computer to perform functions and tasks on the computer, such as playing a game, experiencing a simulation or virtual reality environment, using a computer aided design system, operating a graphical user interface (GUI), or otherwise affecting processes or images depicted on an output device of the computer. Common human interface devices for computers or electronic devices include, for example, a joystick, button, mouse, trackball, knob, steering wheel, stylus, tablet, pressure-sensitive ball, remote control, wireless phone, and stereo controls.

In some interface devices, feedback, such as force feedback, can also be provided to a user. This force feedback can also be referred to as haptic feedback or can be provided in the form of haptic sensations. Each of these interface devices, for example, includes one or more haptic devices, which are connected to a controlling processor, controller, and/or computer. Consequently, by a controlling processor, controller, and/or computer, haptic forces produced by the haptic device can be controlled in coordination with actions of the user and/or events associated with an audible environment, or a graphical or displayed environment by sending control signals or commands to haptic feedback device.

Multi-mode haptic devices that provide desirable performance have been developed. For example, U.S. application Ser. No. 10/301,809, the entire disclosure of which is incorporated herein by reference, discloses haptic feedback using a device having a rotary harmonic moving mass. Accordingly, additional systems and methods for mapping effects produced by multi-mode haptic devices, as well as single-mode haptic devices, are desirable.

SUMMARY

An embodiment of the invention provides a system and method for mapping instructions associated with haptic feedback. An apparatus having a controller including an effect mapper is disclosed. The controller is configured to receive effect instructions from at least one application. The effect mapper is configured to produce multiple haptic instructions in response to at least a portion of the received effect instructions. The haptic instructions are at least partially based on a physical characteristic of a haptic device.

A method is also disclosed that includes receiving an effect instruction and mapping the received effect instruction to at least one haptic instruction based on an effect mapping schema. The mapping is based at least partially on a predetermined characteristic of a haptic device model. At least one haptic signal is transmitted to a haptic device, and is based on the at least one haptic instruction.

BRIEF DESCRIPTION OF THE DRAWINGS

FIG. 4 is a diagram illustrating a transformation matrix, according to an embodiment of the invention.

FIG. 5 is a diagram illustrating transformation of effect instructions, according to an embodiment of the invention.

FIG. 6A is a diagram illustrating an initiation transformation matrix, according to an embodiment of the invention.

FIG. 6B is a diagram illustrating a sustaining transformation matrix, according to an embodiment of the invention.

FIG. 6C is a diagram illustrating a termination transformation matrix, according to an embodiment of the invention.

FIG. 7 is a diagram illustrating a wavelet transformation matrix, according to an embodiment of the invention.

FIG. 8 is a diagram illustrating a pulse mode transformation matrix, according to an embodiment of the invention.

FIG. 11A is a diagram illustrating a transformation matrix, according to an embodiment of the invention.

FIG. 11B is a diagram illustrating a transformation matrix, according to an embodiment of the invention.

DETAILED DESCRIPTION

Figure 1:
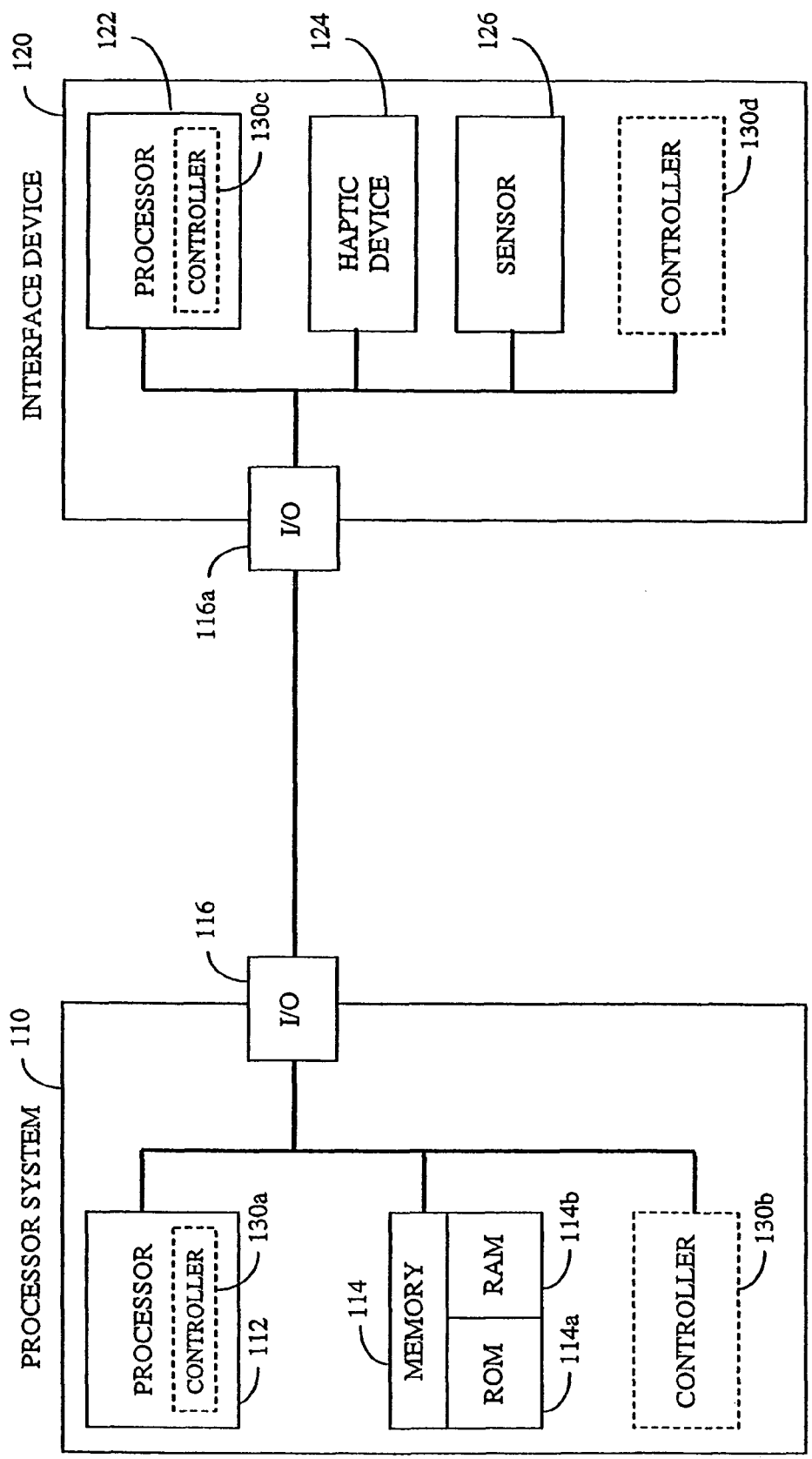
FIG. 1 is a block diagram of a system including a processor system and an interface device, according to an embodiment of the invention.

Systems and methods for mapping instructions associated with haptic feedback are described. More specifically, an apparatus having a controller that includes an effect mapper according to an embodiment of the invention is described. The controller is configured to receive effect instructions from at least one application. The effect mapper is configured to produce haptic instructions in response to at least a portion of the received effect instructions. The haptic instructions are at least partially based on a physical characteristic of a haptic device.

Feedback provided via a haptic device is sometimes referred to as vibrotactile feedback or kinesthetic feedback, and is referred to more generally herein as "haptic feedback." Such haptic feedback can be provided, for example, by way of a haptic device or an interface device including a haptic device. Sensations that can be perceived by a user of a haptic device providing haptic feedback are generally referred to herein as "haptic sensations."

An "application" is software designed to fulfill specific needs. Such applications can include, for example, gaming software, haptic-device control software, etc., or portions thereof.

Physical characteristics of a haptic device are measurable features of that haptic device or components of that haptic device. Physical characteristics can include, for example, mass, shape, acceleration, deceleration, resonant frequencies, harmonic modes, frequency response, performance at varying altitudes or orientations, and/or other measurable features of the haptic device.

An effect instruction is an instruction that is configured to cause a haptic device to output a specific haptic sensation independent of physical characteristics of that haptic device. According to one or more embodiments of the invention, an effect mapper maps received effect instructions to haptic instructions at least partially based on a physical characteristic of a haptic device. Thus, haptic instructions are tailored or modified according to a specific haptic device. When provided to that specific haptic device, these haptic instructions cause the haptic device to output haptic sensations that better replicate the haptic sensations associated with the effect instructions. It should be noted that the term "instructions" as used herein connection with effect instructions and haptic instructions can include, for example, signals, commands, or the like.

Effect mappings, according to one or more embodiments of the invention, can alter or control effect components or parameters of a haptic sensation, such as amplitude, waveshape, frequency, phase, duration, or delay of the haptic feedback to be output by a haptic device. These effect components or parameters can form a portion of an overall haptic sensation to be output by way of a haptic device, for example, by way of synthesis or other combination. Thus, such haptic feedback components can be output simultaneously or in sequence, for example. In cases where haptic feedback components are synthesized, the frequency of a first component can be modulated by the frequency of a second component, for example. When components are to be output in sequence, individual components can be used to map the start, the middle, and the end of a haptic feedback, for example.

FIG. 1 is a block diagram of a system having a processor system and an interface device, according to an embodiment of the invention. The system illustrated in FIG. 1 includes a processor system 110 in communication with an interface device 120. The processor system 110 can be, for example, a commercially available personal computer or a less complex computing or processing device that is dedicated to performing one or more specific tasks. For example, the processor system 110 can be a terminal dedicated to providing an interactive virtual reality environment, such as a gaming system, or the like.

The processor system 110 includes a processor 112, which according to one or more embodiments of the invention, can be a commercially available microprocessor. Alternatively, the processor 112 can be an application-specific integrated circuit (ASIC) or a combination of ASICs, which is designed to achieve one or more specific functions, or enable one or more specific devices or applications. In yet another alternative, the processor 112 can be a circuit analog or digital, or a combination of multiple circuits.

Alternatively, the processor 112 can optionally include one or more individual sub-processors or coprocessors. For example, the processor can include a graphics coprocessor that is capable of rendering graphics, a controller that is capable of controlling one or more devices, a sensor that is capable of receiving sensory input from one or more sensing devices, and so forth.

The processor system 110 also includes a memory component 114. As shown in FIG. 1, the memory component 114 can include one or more types of memory. For example, the memory component 114 can include a read only memory (ROM) component 114a and a random access memory (RAM) component 114b. The memory component 114 can also include other types of memory not illustrated in FIG. 1 that are suitable for storing data in a form retrievable by the processor 112. For example, electronically programmable read only memory (EPROM), erasable electrically programmable read only memory (EEPROM), flash memory, as well as other suitable forms of memory can be included within the memory component 114. The processor system 110 can also include a variety of other components, depending upon the desired functionality of the processor system 110.

The processor 112 is in communication with the memory component 114, and can store data in the memory component 114 or retrieve data previously stored in the memory component 114. The components of the processor system 110 can communicate with devices external to the processor system 110 by way of an input/output (I/O) component 116.

According one or more embodiments of the invention, the I/O component 116 can include a variety of suitable communication interfaces. For example, the I/O component 116 can include wired connections, such as standard serial ports, parallel ports, universal serial bus (USB) ports, S-video ports, large area network (LAN) ports, small computer system interface (SCSI) ports, and so forth. Additionally, the I/O component 116 can include, for example, wireless connections, such as infrared ports, optical ports, Bluetooth wireless ports, wireless LAN ports, or the like.

By way of the I/O component 116, the processor system 110 can communicate with other devices, such as interface devices 120. These interface devices 120 can be configured to provide haptic feedback. Each interface device 120 can communicate with the processor system 110 by way of an I/O component 116a, which is similar to the I/O component 116 of the processor system 110 and can include any of the wired or wireless communications ports described above in connection with that I/O component 116. Thus, the communications link between the I/O component 116 of the processor system 110 and the I/O component 116a of the interface device 120 can take a variety of forms, including, for example, wired communications links, wireless communications links (e.g., RF links), optical communications links, or other suitable links.

The interface device 120 includes a number of components, such as a processor 122, a haptic device 124, and a sensor 126. As with the components of the processor system 110, the interface device 120 can include additional components. For example, the interface device can include additional duplicates of the components shown in FIG. 1. Additionally, the interface device 120 can include other components not shown in the figure. For example, where it is desirable to store data received by the interface device 120 via I/O component 116a, a suitable memory component or buffer memory component can be used.

The processor 122 of the interface device 120, can be similar to the processor 112 of the processor system 110, described above, or can be specifically designed (e.g., an ASIC) and/or programmed for the functionality of the interface device 120. As with the processor 112 of the processor system 110, the processor 122 of the interface device 120, can include a variety of sub-processors, which can, for example, be used in parallel.

As discussed above, the interface device 120 includes a haptic device 124, which is used to provide tactile or haptic feedback to a user of the interface device 120. According to an embodiment of the invention, haptic feedback can be provided by way of a physical object, such as a housing, a manipulandum, or the like. The haptic device 124 can take a variety of forms, including one or more haptic devices that each have multiple operational modes associated with multiple corresponding frequency ranges. Some examples of haptic device 124 configurations that can be used in accordance with one or more embodiments of the invention will be described in greater detail below. The examples of haptic devices 124 given below, however, are not intended to form an exhaustive list of all types of haptic devices 124 that can be included in the interface device 120 but are intended instead as examples only.

For example, the haptic device 124 can be a harmonic (e.g., multi-mode) haptic device or a non-harmonic (e.g., single mode) haptic device. Harmonic haptic devices 124 have more than one operational mode, while non-harmonic haptic devices 124 can have, for example, only one operational mode. The operational mode associated with non-harmonic haptic devices, as well as with harmonic haptic devices operating in a single operational mode is termed the "unidirectional" operational mode. Harmonic haptic devices also have a "harmonic" operational mode, which corresponds to operation that use harmonics of the physical elements within the haptic device 124. For example, in cases where the haptic device 124 uses a rotational mass to provide vibrotactile haptic feedback, a spring and mass system, which has more than one harmonic mode, can be used in more than one corresponding operational mode.

The sensor 126 of the interface device 120 is configured to sense input from a user of the interface device 120. For example, the sensor 126 can be used to sense manipulation or movement of a physical object, such as a manipulandum, of the interface device 120. The sensor 126 can also be used to sense other forms of user input, such as pressure, speed, acceleration, torque, light, or other measurable quantities. For example, the sensor 126 can incorporate a piezoelectric sensor to sense pressure, an inertial measurement unit (IMU), such as an accelerometer, to sense various forms of motion, a photovoltaic sensor to sense changes in light levels, and/or other sensors.

As shown in FIG. 1, the various components of the interface device 120 are in communication with one another and with the components of the processor system 110 (via the I/O components 116, 116a). The processor 122 of the interface device 120, for example, can be used to control the haptic device 124 based on information received from the sensor 126. Similarly, the processor 112 of the processor system 110 can be used to control the haptic device 124 of the interface device 120 based on information received from the sensor 126 of the interface device 120; in such an embodiment, the processor 122 need not be present. Alternatively, the processor 112 of the processor system 110 (also referred to as a "host processor") can be used in coordination with the processor 122 of the interface device 120 (also referred to as a "local processor") both to interpret data received from the sensor 126 and to control the haptic device 124.

The processor system 110 and the interface device 120 can optionally use one or more controllers 130a, 130b, 130c, 130d (which can be referred to hereinafter as a controller 130, collectively, individually, or as a subset). As shown in FIG. 1, a controller or control method 130 can exist within the processor 112 of the processor system 110 and/or the processor 122 of the interface device 120. Additionally, a controller 130 can be a separate component connected to the other components of the processor system 110 and/or the interface device 120 via a bus or other suitable connection.

Figure 2:
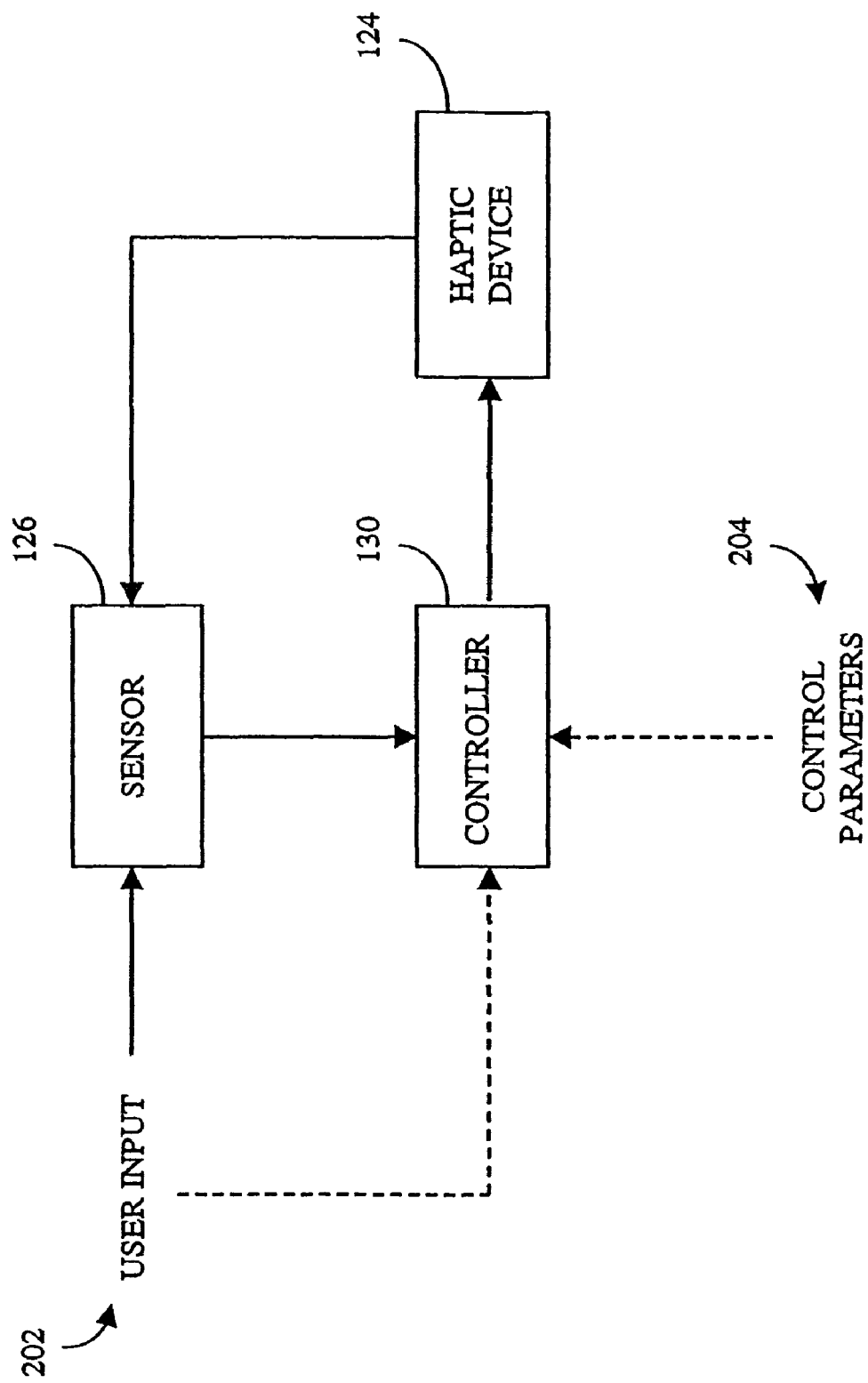
FIG. 2 is a diagram illustrating a haptic device, a controller, and a sensor, according to an embodiment of the invention.

FIG. 2 is a diagram illustrating a haptic device controller, and a sensor, according to an embodiment of the invention. FIG. 2 also shows different data values provided to the system.

As shown in FIG. 2, user input 202 is provided (e.g., via the user interface device 120 shown in FIG. 1), and is received by the sensor 126. The user input 202 can also optionally be provided to a controller 130 (e.g., by way of the sensor 126, or some other devices configured to accept and convey user input). The sensor 126 also receives information from the haptic device 124. For example, the sensor 126 can sense the actual movements of the haptic device 124, thereby sensing the tactile or haptic feedback output by the haptic device 124.

According to an arrangement of the system shown in FIG. 2, the controller 130 receives data from the sensor 126 (shown by a solid line), and optionally receives user input 202 and control parameters 204 (shown by dotted lines). Based on the data from the sensor 126, and any received optional user input 202 and control parameters 204, the controller 130 controls the tactile output or haptic feedback of the haptic device 124. This is accomplished by a control signal that the controller 130 outputs to the haptic device 124. The control signal can be based on a number of parameters, including, for example, control parameters 204. Additionally, control parameters 204 and other parameters that are used by the controller 130 to control the haptic device 124 can be stored in the memory component 114 of the processor system 110, or by another suitable memory component (e.g., a memory component of the interface device 120).

Figure 3A:
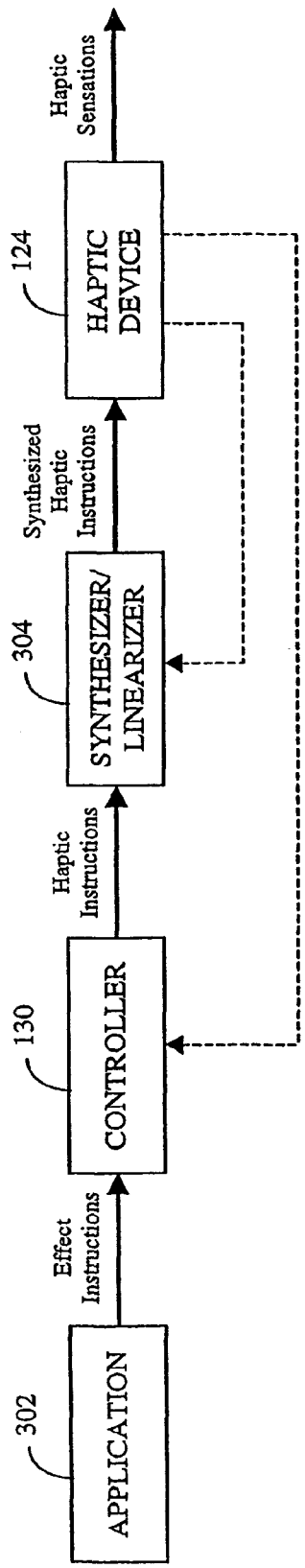
FIG. 3A is a block diagram illustrating a haptic system, according to an embodiment of the invention.

FIG. 3A is a block diagram illustrating a haptic system, according to an embodiment of the invention. More specifically, FIG. 3A illustrates various elements of a haptic device used to generate haptic sensations.

As shown in FIG. 3A, an application 302 that can run on a processor system (e.g., the processor system 110 shown in FIG. 1) or an interface device (e.g., the interface device 120 shown in FIG. 1, is provided). The application 302 communicates effect instructions to a controller 130. The controller 130, in turn, provides haptic instructions to a synthesizer/linearizer 304, which may be either a synthesizer or a linearizer, or a combination of both (referred to herein as "synthesizer/linearizer"). The synthesizer/linearizer 304 receives the haptic instructions and provides synthesized haptic signals to a haptic device 124. Upon receiving synthesized haptic signals from the synthesizer/linearizer 304, the haptic device 124 produces haptic sensations that a user can perceive via an interface device 120.

Information can optionally be provided to the controller 130 and/or the synthesizer/linearizer 304 from the haptic device 124 in the form of one or more feedback signals (shown by dotted lines in FIG. 3A). In cases where feedback is provided to the controller 130, modified haptic instructions are provided from the controller 130 to the synthesizer/linearizer 304, and modified synthesized haptic signals are provided by the synthesizer/linearizer 304 to the haptic device 124. Alternatively, in the case where feedback is provided from the haptic device 124 to the synthesizer/linearizer 304, the synthesizer/linearizer 304 provides modified synthesized haptic signals to the haptic device.

The physical location of the various elements shown in FIG. 3A can be varied. For example, the application 302, the controller 130, the synthesizer/linearizer 304, and the haptic device 124 can all be collocated within an interface device 120, according to one or more embodiments of the invention. Alternatively, any combination of the components shown in FIG. 3A, with the exception of the haptic device 124 can form part of the processor system 110, which is in communication with the interface device 120, which includes the haptic device 124.

When the application 302, the controller 130, and the synthesizer/linearizer 304 are collocated on the same device, the architecture can be referred to as an "embedded control system." Such an architecture can be used, for example, in cellular telephones, personal digital assistants (PDAs), and other handheld devices. When the application 302, the controller 130, and the synthesizer/linearizer 304 are not collocated, the architecture of the system is a "distributed architecture system." A distributed architecture system can be used, for example, in gaming systems, personal computing systems, and other systems that use peripheral or external interface devices 120 to access functionality of a central processor system 110. Alternatively, when the controller 130 is located within a processor system 110, and the synthesizer/linearizer 304 is located within a remote interface device 120, the architecture of the system can be referred to as a "hybrid architecture system." Alternatively, when the application 302, the controller 130, and the synthesizer/linearizer 304 are not collocated in the same device that houses the haptic device 124, the architecture of the system can be referred to as a "force-streaming architecture system."

Figure 3B:
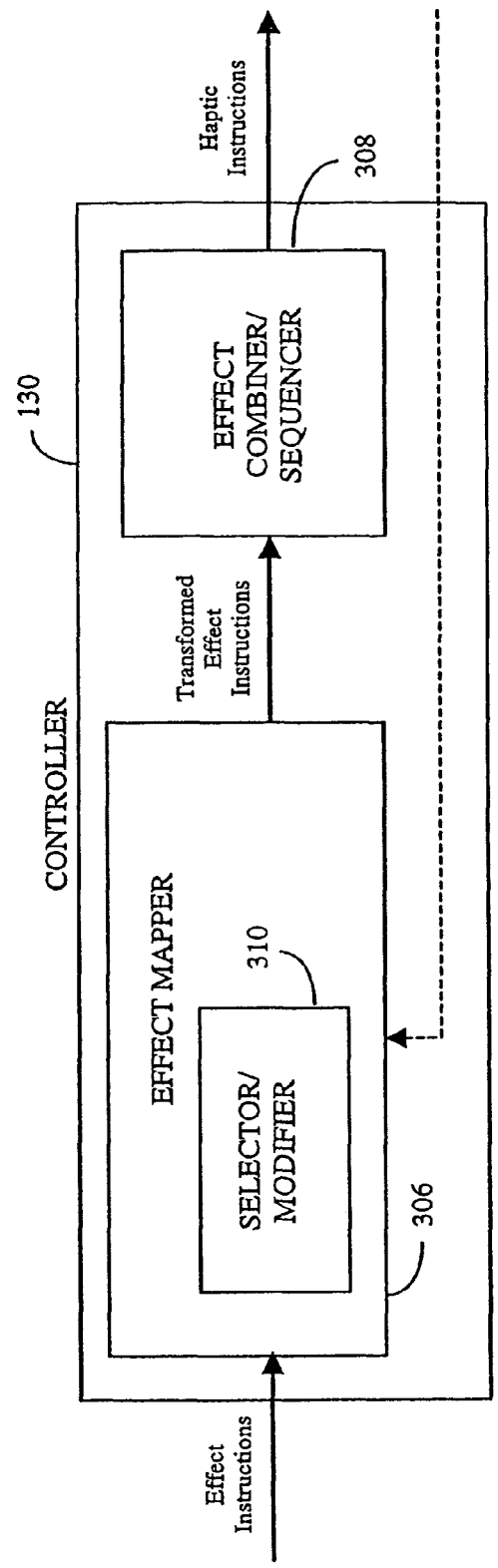
FIG. 3B is a block diagram illustrating the controller shown in FIG. 3A, according to an embodiment of the invention.
Figure 3C:
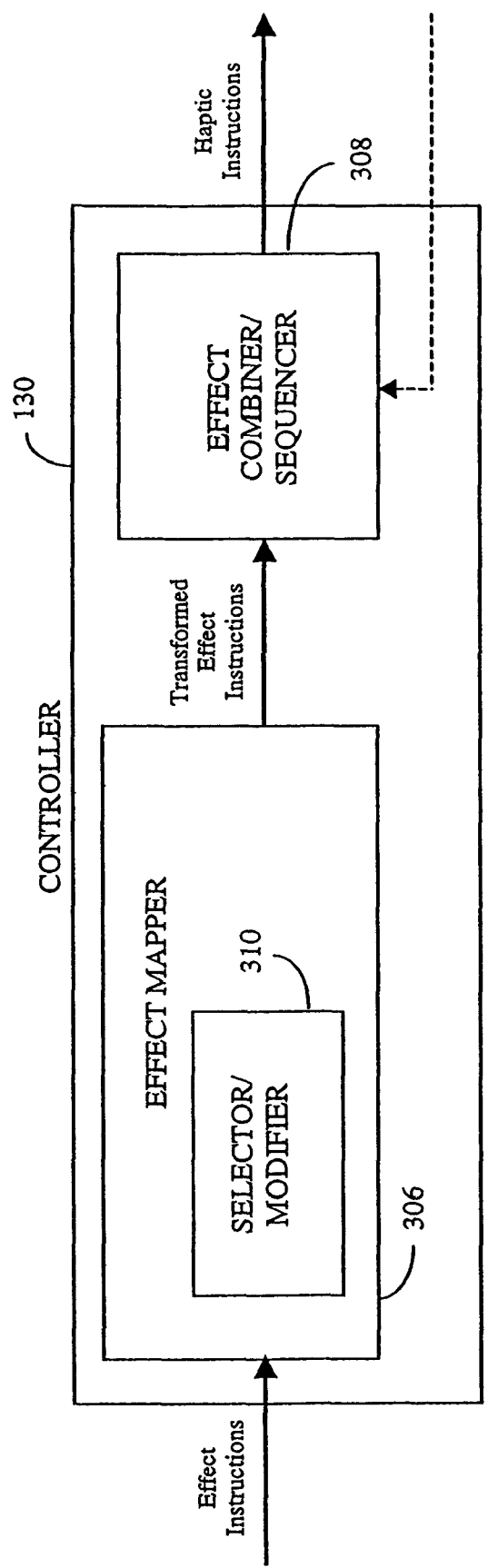
FIG. 3C is a block diagram illustrating the controller shown in FIG. 3A, according to an embodiment of the invention.

FIGS. 3B and 3C illustrate the controller 130 in greater detail, according to one or more embodiments of the invention. The configuration illustrated in FIGS. 3B and 3C differ only in which component within the controller 130 receives optional feedback from the haptic device 124.

The controller 130 can use a variety of suitable techniques to convert effect instructions to haptic instructions. For example, various duty-cycle-related control methods for controlling a multi-mode haptic device can be used to determine appropriate drive signals applied to the haptic device 124. A description of duty-cycle-related control methods that can be used according to one or more embodiments of the invention can be found in U.S. application Ser. Nos. 09/669,029 and 09/675,995, the disclosures of which are incorporated herein by reference.

Multiple blending, effect switching, and/or selection algorithms can be implemented by way of the controller 130. For example, methods for controlling haptic devices having multiple operational modes are described in U.S. application Ser. No. 10/873,643 entitled System and Method for Controlling Haptic Devices Having Multiple Operational Modes, the entire disclosure of which is incorporated herein by reference in its entirety. Additionally, other suitable techniques can be implemented by way of the controller, such as envelope modulation, a sum-of-products technique, and time domain filtering. The sum-of-products techniques use a weighting factor, which can be applied to effect instructions by either the multiplication of effect amplitudes. Effects can also be gated to produce additional effects.

The controller 130 can also use a switching technique to switch between different frequency ranges. A switching technique can use various parameters, such as the period of a desired haptic sensation to control the output of the haptic device 124. Long periods (i.e., low frequencies) of desired haptic sensations that are below a threshold frequency can use a pulse mode mapping technique, such as techniques using a pulse mode transformation matrix (e.g., the matrix described below in connection with FIG. 8). Desired haptic sensations having periods within a middle range (i.e., middle range frequencies), for example within about 20 to 30 Hz, can be mapped using direct current (DC) mapping used with single-mode haptic devices 124. Desired haptic sensations having shorter periods (i.e., higher frequencies) can use direct mapping to produce the haptic instructions from the received effect instructions, according to one or more embodiments of the invention.

The controller 130 can perform different operations on received effect instructions based upon the frequencies of the effect instructions and/or the frequencies of the desired haptic sensations to be output from the haptic device 124. According to one or more embodiments of the invention that operate on effect instructions based on their frequency ranges, several frequency ranges can be defined, each defined frequency range having different mapping techniques. Examples of frequency ranges that can be used in mapping effect instructions for a multi-mode haptic device 124 can include, for example, a low-frequency range (e.g., below about 20 Hz), a unidirectional frequency range (e.g., between about 20 to 30 Hz), a transitional frequency range above the unidirectional frequency range, but below a harmonic/resonant frequency range of the haptic device, a harmonic/resonant frequency range (i.e., a range of frequencies surrounding the harmonic/resonant frequency), a high-frequency range above the harmonic/resonant frequency of the haptic device 124.

The controller 130 includes an effect mapper 306 and an effect combiner/effect sequencer 308, which can include a combiner alone, a sequencer alone, or a combination of both (collectively referred to herein as an "effect combiner/sequencer"). The effect mapper includes a selector/modifier 310, which can include a selector alone, a modifier alone, or a combination of both (collectively referred to herein as a "selector/modifier"). The selector/modifier 310 can be used to gate and/or modify the received effect instructions to cause the controller 130 to properly render haptic instructions. Where used herein, the term "modify" includes various ways of modifying such as, for example, modulating.

The effect mapper 306 of the controller 130 receives effect instructions from the application 302. Based upon one or more predetermined mapping techniques, the effect mapper 306 maps the received effect instructions to produce haptic instructions. The mapping of effects can be accomplished in a variety of ways, several of which will be described in greater detail below. By way of one or more effect mapping techniques, the effect mapper 306 changes the form of the received effect instructions to provide transformed effect instructions to the effect combiner/sequencer 308. These transformed effect instructions are configured to cause the controller 130 to output haptic instructions configured to render a desired haptic effect (i.e., output a desired haptic sensation) via the haptic device 124.

According to one or more embodiments of the invention, the effect mapper 306 can use effect-blending techniques to blend multiple received effect instructions over one or more frequency ranges of the haptic device 124. Using effect-blending techniques, the effect mapper 306 can generate multiple effects, each of the multiple effects being optimized for one or more frequency ranges of the haptic device 124. Some effect blending techniques can be implemented by the effect mapper 306 applying a gain term to the amplitude of the effects within the effect instructions that depend on frequency. By applying such a gain term, effect instructions that are optimized for one or more of the operational frequency ranges of the haptic device 124 can be transformed in such a manner that they smoothly blend as a function of frequency over all or most of the operational frequency ranges of the haptic device 124. Thus, effect instructions that are optimized for a unidirectional operational mode, for example, can be smoothly blended up to and including frequency ranges surrounding a harmonic/resonant frequency of the haptic device 124.

The effect combiner/sequencer 308 receives transformed effect instructions from the effect mapper 306 and gates the haptic instructions output to the synthesizer/linearizer 304, or example, based on selection criteria. Selection criteria used by the effect combiner/sequencer 308 can include, for example, a start time of an effect, effect decimation, or other suitable criteria. Such gating saves synthesizer and/or processor resources. The effect combiner/sequencer 308 can also combine effects where appropriate. For example, according to one or more embodiments of the invention, multiple effects can be combined via the effect combiner/sequencer 308 using techniques such as summation, multiplication, convolution, or other suitable combining technique. Additionally, the effect combiner/sequencer 308 can modify haptic instructions received from the effect mapper 306 in other ways. For example, the effect combiner/sequencer 308 can normalize amplitudes of haptic sensations intended to be produced in response to haptic instructions provided to the synthesizer/linearizer 304.

The effect combiner/sequencer 308 can perform normalization by way of a variety of techniques. For example, normalization can be performed on effect instructions or transformed effect instructions that have amplitudes exceeding 100% (i.e., that exceed the maximum possible amplitude) that either the synthesizer/linearizer 304 can render, or the haptic device 124 can output in the form of haptic sensations. In performing such normalization, all of the effects defined in the effect instructions or transformed effect instructions can be modified (e.g., amplitudes can be reduced) proportionally. According to one or more embodiments of the invention, normalized amplitudes $\alpha_{i\_norm}$ can be determined as shown below in Equation 1.

$$\alpha_{i\_norm} = \frac{\alpha_i}{\left(\sum_{j=1}^{n} \alpha_j\right)} \quad (1)$$

In Equation 1 above, the normalized amplitudes $\alpha_{i\_norm}$ are determined by normalizing each amplitude $\alpha_i$ in the received effect instructions by the total of the amplitudes in the received effect instructions (shown by the summation in the denominator of the quotient in Equation 1).

This normalized amplitude applies to the net effect instructions or transformed effect instructions, such that any possible combination of effects does not saturate the synthesizer/linearizer 304, or overload the haptic device 124. The remaining effects, or composite of effects $f_{composite}$, can be scaled using the normalization amplitude $\alpha_{i\_norm}$, as shown below in Equation 2.

$$f_{composite}(t) = \alpha_{i\_norm} \sum_{i} f_i(t) \quad (2)$$

As shown in FIG. 3B, feedback signals may optionally be provided from the haptic device 124 to the effect mapper 306. By way of this optional feedback loop, characteristics of the haptic device 124 can be provided to the effect mapper 306. These characteristics can include, for example, physical characteristics of the haptic device 124. The effect mapper 306 can use these physical characteristics, along with optional additional parameters, to modify the effect instructions received from the application 302. Thus, effect instructions that are received from the application 302, which may have difficulty producing the desired sensation on the haptic device 124 because of physical characteristics of that haptic device 124, can be modified by the effect mapper 306 in such a manner to produce the desired haptic sensation via the haptic device 124. In other words, the effect mapper 306 can improve or tailor haptic instructions based on the received effect instructions and physical characteristics of the device.

Similarly, in FIG. 3C, an optional feedback signal is provided from the haptic device 124 to the effect combiner/sequencer 308. By way of this optional feedback loop, the effect combiner/sequencer 308 can modify haptic instructions received from the effect mapper 306 in such a manner to produce a desired haptic sensation via the haptic device 124. As with the feedback signal described above in connection with FIG. 3B, optional feedback provided to the effect combiner/sequencer 308 can be based on physical characteristics of the haptic device 124. The effect combiner/sequencer 308 can use optional feedback, either alone or along with other parameters, to modify the haptic instructions provided to the synthesizer/linearizer 304 in such a manner to output a desired haptic sensation via the haptic device 124. For example, haptic instructions output by the effect mapper 306 could be normalized by the effect combiner/sequencer 308 according to one or more specific physical characteristics of the haptic device 124 in such a manner that the haptic device 124 can output a desired haptic sensation.

Returning to FIG. 3A, the synthesizer/linearizer 304 can, according to one or more embodiments of the invention, translate the haptic instructions into synthesized haptic instructions in substantially real-time. These synthesized haptic instructions can be accepted as input into the haptic device 124 directly, or by way of an amplifier or other component (not shown in FIG. 3A) used to facilitate the operation of the haptic device 124. The synthesizer/linearizer 304 can also modify the haptic instructions according to a variety of parameters, such as an angle of the rotation of an actuator (e.g., a motor), rotational velocity of an actuator, or other suitable parameters. The velocity and/or dependencies on the angle of rotation of an actuator can be included as part of the effect vectors provided in the effect instructions from the application 302 and/or the haptic instructions from the controller 130. Additionally, according to one or more embodiments of the invention, the velocity and/or angle of rotation, as well as other parameters, can be provided as a feedback signal from the haptic device 124 itself via a feedback loop (shown using a dotted line in FIG. 3A).

The synthesizer/linearizer 304 is also responsible for linearization compensation. In accordance with one or more embodiments of the invention, the synthesizer/linearizer 304 provides linearization compensation by amplitude mapping to compensate for non-linear characteristics of any amplifiers within the system shown in FIG. 3A. In accordance with one or more alternative embodiments of the invention, the synthesizer/linearizer 304 provides linearization compensation to compensate for non-linear performance of the haptic device 124. Such non-linear performance can be caused, for example, by motor inductance of a motor or other actuator of the haptic device 124 such that the mechanical output of the system is linearized relative to the input command.

The synthesizer/linearizer 304 can transform the haptic instructions received from the controller 130 to create synthesized haptic instructions that are angularly dependent on amplitude. That is, the synthesized haptic instructions provided by the synthesizer/linearizer 304 can create an effect that takes advantage of angular characteristics of the haptic device 124, or of an actuator of the haptic device 124. This angular dependence can be used advantageously by one or more techniques, including, for example, peak angular efficiency techniques, ripple torque compensation techniques, and/or force vectoring techniques. The peak angular efficiency techniques and/or the ripple torque compensation techniques can be implemented either within the controller 130, or within the synthesizer/linearizer 304, depending upon desired performance of the system. Force vectoring can be implemented, for example, as an additional effect vector parameter, either by the effect mapper 306 or the effect combiner/sequencer 308 of the controller, or by the synthesizer/linearizer 304.

Peak angular efficiency techniques can account for physical characteristics of the haptic device 124. Specifically, in embodiments using a rotating mass haptic device 124, peak angles of rotation can occur, for example, where the rotor winding and the magnet of the motor are aligned. Using feedback signals from the haptic device 124, position feedback can be provided to allow either the controller 130 or the synthesizer/linearizer 304 to servo-control the haptic device's angle of rotation. Such servo control can cause the haptic device 124, for example, to operate in a harmonic mode at its peak efficiency. Using peak angular efficiency techniques can allow less expensive motors to be used (e.g., high-ripple-torque motors, etc.) and/or higher outputs to be generated. Additionally, because power consumption is reduced, battery life can be extended, and/or energy costs can otherwise be reduced.

Ripple torque compensation techniques compensate for ripple torque that may be present during operation of the haptic device 124. Ripple torque compensation techniques can, according to one or more embodiments of the invention, configure compensation that is specific to each haptic device 124 used within the system. For example, a compensation table can be developed for each motor, which optimally minimizes ripple torque at various frequencies over which the haptic device 124 is driven. Ripple torque compensation can be used, for example, in conjunction with velocity feedback, or other feedback signals provided from the haptic device 124 to the controller 130 or the synthesizer/linearizer 304. A ripple torque compensation technique can, for example, model the haptic device 124 (e.g., motor and mass) as a second-order system, and minimize accelerations under constant load.

Force vectoring techniques can be used to control a haptic device 124, such as a multi-mode haptic device. Force vectoring can advantageously control the haptic device 124 in such a manner that when the motor or actuator of the haptic device 124 is asymmetrically supported. Additionally, frequency and magnitude of the haptic sensations output by the haptic device 124 can be controlled, for example, by servo-controlling the motor or actuator to an angle of rotation with angular stiffness characteristics that uniquely determine the resonant mode or frequency of the motor or actuator system of the haptic device 124. According to one or more embodiments of the invention, force-vectoring techniques can also use feedback provided by the haptic device 124 to provide information about regarding the haptic device 124 (e.g., physical characteristics, etc.) on a once-per-revolution basis, for example. The controller 130 or the synthesizer/linearizer 304 can use this information to optimally compensation for or use the gravity vector acting on the haptic device 124.

Force vectoring techniques can be implemented either with a feedback control loop, or without a feedback loop. For example, an element, which is similar to the time domain phase element $\phi$, can be included as an element within a force vector described in the effect instructions received by the controller 130 or the haptic instructions provided by the controller 130. The format of force vectors is discussed in greater detail below in connection with Equation 5.

Additionally, or alternatively, to the techniques described above, position and/or velocity feedback techniques can also be used. For either position feedback techniques or velocity feedback techniques, the position of an actuator of the haptic device 124 is provided via a feedback loop to the synthesizer/linearizer 304 and/or the controller 130. Velocity feedback techniques can, for example, measure the time rate of change of position (e.g., the first derivative of position) to determine the velocity of the actuator of the haptic device 124. This velocity information can be used by the synthesizer/linearizer 304 as a gain term that is applied to the output signal of the synthesizer to create modified synthesized haptic instructions. The rotational velocity of a rotating mass within a rotating mass haptic device 124 can be controlled, for example, by these modified synthesized haptic instructions.

A velocity feedback technique can also use the difference between the period element of effect vectors within the haptic instructions received by the synthesizer/linearizer 304 and the actual period measured by the velocity feedback control loop from the haptic device 124. The difference between the two periods can be applied as a gain term to the synthesized haptic instructions to produce modified synthesized haptic instructions. This gain term can be either positive or negative, depending upon the difference between the two periods. The modified synthesized haptic instructions minimize the error between the period of the effect vectors received by the synthesizer/linearizer 304 and the actual period of effects, or haptic sensations, output by the haptic device 124.

According to one or more embodiments of the invention, the effect mapper 306 maps effect instructions received from the application 302 to create haptic instructions configured to produce a desired haptic sensation via the haptic device 124, using or more transformational matrices. Such transformational matrices can be configured transform effect instructions received from the application 302. According to one or more of the embodiments of the invention, multiple effect matrices can be provided where each effect matrix generates a single, transformed effect instruction. In transformational matrix implementation, operation by a single matrix on a received effect instruction would constitute a scaler multiplication of the received effect instruction. Alternatively, where two or more transformational matrices are used to produce multiple transformed effect instructions, each received effect instruction can be multiplied by two or more matrices, the result of which is a non-scaler product. Operations involving products of multiple matrices can be referred to as modulation, as the transformed effect that is achieved by multiplying each received effect instruction with a first matrix is then multiplied, or "modulated," by the second transformation matrix. If the first transformation matrix is a scaler quantity, and the second transformation matrix is a vector quantity, the scaler transformation matrix essentially amplitude modulates the product achieved by the vector matrix. As a practical matter the matrix operations need not be explicitly used, rather the operations may be reduced to arithmetic operations.

Transformation matrices can be formed such that effects are defined on each row of the matrix, and each column of the matrix corresponds to various parameters of each effect. Examples of parameters that may be defined in the columns of a transformation matrix include, for example, amplitude, waveshape, frequency, phase, duration, and/or delay. For example, a matrix having dimensions M×N includes M effects each capable of modifying N parameters.

In cases where the parameters of each effect found in a transformation matrix include amplitude, waveform, frequency, phase, duration and delay, the generalized form of the effect is shown below in Equation 3.

$$\alpha \cdot \psi\left(\frac{2\pi t}{T} + \phi\right) \cdot [U(t-\delta) - U(t-\tau-\delta)] \quad (3)$$

In Equation 3 above, $\alpha$ is the amplitude, $\psi$ is the type of the periodic function (e.g., sinusoid, square-wave, saw-tooth wave, etc.), T is the period, $\phi$ is the phase, $\tau$ is the duration of the effect, and $\delta$ is the start delay. The period T relates to the frequency of the effect $\omega$ in the manner shown below in Equation 4.

$$T = \frac{2\pi}{\omega} \leftrightarrow \omega = \frac{2\pi}{T} \quad (4)$$

Thus, each effect would be defined by unique parameters corresponding to that effect, as shown below in Table 1.

TABLE 1

| Effect 1 → | $\alpha_1$ | $\psi_1$ | $\omega_1$ | $\Phi_1$ | $\tau_1$ | $\delta_1$ | $n_1$ |
|---|---|---|---|---|---|---|---|
| Effect 2 → | $\alpha_2$ | $\psi_2$ | $\omega_2$ | $\Phi_2$ | $\tau_2$ | $\delta_2$ | $n_2$ |
| Effect 3 → | $\alpha_3$ | $\psi_3$ | $\omega_3$ | $\Phi_3$ | $\tau_3$ | $\delta_3$ | $n_3$ |
| . | . | . | . | . | . | . | . |
| . | . | . | . | . | . | . | . |
| . | . | . | . | . | . | . | . |
| Effect m → | $\alpha_m$ | $\psi_m$ | $\omega_m$ | $\Phi_m$ | $\tau_m$ | $\delta_m$ | $n_m$ |

The variables of each effect shown above correspond to the variables shown in Equation 3 above, each variable having a subscript that corresponds to its effect. The additional variable n is the number of repetitions for the given effect (i.e., the number of times the effect is to be repeated).

Each of the effects listed above can be expressed in the form of an effect vector, as shown below in Equation 5.

$$\epsilon_m = \{\alpha_m, \psi_m, \omega_m, \phi_1, \tau_m, \delta_m, n_m, m\} \quad (5)$$

The effect vector shown above in Equation 5 includes the parameters described above in connection with Equation 3 and Table 1, and includes an additional parameter (in this case represented by the value m), which is referred to as the "augmentation element." The augmentation element allows the effect vector to be assigned parameters.

FIG. 4 is a diagram illustrating a transformation matrix, according to an embodiment of the invention. In the matrix shown in FIG. 4, each element i has a unique row and column index expressed as two respective subscript values. Each row of the matrix shown in FIG. 4 is populated using effect vectors, such as the effect vector shown in Equation 5 above. The index values are shown in the same order along each row and column for reference. Elements that have the identical row and column indices (i.e., elements along the diagonal of the matrix) perform a direct mapping of effect parameters. Thus, for example, if the first element $i_{\alpha\alpha}$ has a value other than zero, that value directly transforms the amplitude of the effect instructions received from the application 302 (shown in FIG. 3A). The last row of the matrix shown in FIG. 4 allows additional effect parameters to be introduced into the transformation performed on the effect instructions received from the application 302.

A matrix having values only in the diagonal element locations is known as a scaler matrix. According to one or more embodiments of the invention, a scaler matrix of the form of the matrix shown in FIG. 4 can be used to directly scale the parameters. For example, a scaler matrix can directly scale the parameters described above in connection with Equation 1, which are associated with effect instructions received from the application 302. Alternatively, altering other matrix elements causes parameters of effect instructions received from the application 302 to be mapped in various different ways, some of which will be described in detail below. Additionally, the effect of manipulating some elements of the matrix shown in FIG. 4 on the transformations performed on the effect instructions received from the application 302 will be discussed below.

Because various haptic devices 124 may respond differently to instructions to execute haptic sensations, manipulating the values within a transformation matrix can alter the haptic sensations provided by a haptic device 124 in a desirable manner. For example, certain haptic devices 124 may produce a stronger haptic sensation when being driven by a signal having the form of a square wave rather than a sinusoidal signal. This higher perceived square-wave amplitude can be compensated in haptic devices by changing the $i_{\omega\alpha}$ term, which maps the shape of the haptic instructions signal (i.e., the waveform) to the amplitude of the haptic device 124.

Depending on physical characteristics of the haptic device 124 being used, a variety of equalization parameters may be required. For example, users using similar interface devices 120 (e.g. cell phones, gaming systems, etc.), would expect to perceive similar haptic sensations provided via the haptic device 124 for similar events. Thus, for example, users of gaming systems would expect to perceive events similarly on different individual interface devices 120 provided by a common manufacturer. Likewise, users may expect to perceive haptic sensations provided by different devices (from either the same or different manufacturers), but which are portraying events from similar applications, in a similar manner.

Equalization is a technique whereby differences among haptic devices 124 can be accounted for, so that haptic sensations provided by haptic devices 124 having varying physical characteristics can be produced in a substantially uniform manner. For example, some parameters of the haptic device 124 that may require equalization include frequency response, phase, period, and start delay. These parameters can be transformed using a matrix of the form of the matrix shown in FIG. 4, which has non-zero values for the parameters $i_{\omega x}$, $i_{\phi x}$, $i_{\tau x}$, and $i_{\delta x}$, respectively (where x represents any row of the matrix shown in FIG. 4). Each of these terms maps the frequency response, phase, period, and start delay into haptic sensation amplitude.

Some haptic devices 124 may exhibit greater friction than others. For example, in the case of haptic devices that use a rotating mass to provide vibrotactile feedback, higher friction could correspond to a longer delay in reaching full speed, which corresponds to a delay in achieving the full amplitude of a desired haptic sensation. A transformed matrix having a value entered for $i_\alpha$ will provide an additional bias to the actuator of the haptic device 124, such that friction of the haptic device 124 and its actuator can be compensated. According to one or more embodiments of the invention, changing the term $i_\alpha$ provides a bias that is proportional to the energy delivered from the haptic device 124. Alternative embodiments of the invention can provide a bias that is proportional to energy delivered to the haptic device 124. The type of bias provided by embodiments of the invention can be varied depending upon design constraints, and desired functionality.

Additional transforms of the effect instructions received from the application 302 may be desired. For example, to convey a perception of high amplitude to a user of the haptic device 124, the waveform of the effect instruction signal can be modified. For example, an effect instruction signal can be varied by allowing saturation. By way of such a saturation technique, the amplitude of the effect instructions is mapped to the waveform by modifying the element $i_{\alpha\psi}$. Modifying this term has a similar effect to saturating an audio amplifier, and thus converts sinusoidal waveforms into square-like waveforms, and introduces high frequency components into the transformed effect instructions. The perceived output has an increased apparent magnitude. The haptic sensation produced by a saturation technique has a different feel from haptic sensations produced by way of standard sinusoidal effect instructions. Each of the transforms described above can be used in connection with any haptic device 124 systems, such as systems utilizing harmonic haptic devices or systems using non-harmonic haptic devices.

According to one or more embodiments in which the haptic device 124 uses rotating mass in a harmonic operational mode, the mass of the haptic device 124 undergoes a shorter, angular displacement at maximum amplitudes. This shorter angular displacement results in part from the mass displacement being conveyed as harmonic content rather than eccentric mass content. Lower frequency effects or effects within a unidirectional operational mode, on the other hand, benefit from the summation of two acceleration vectors. Frequency-waveform mapping alters the shape of the effect instructions received from the application 302 at high frequencies to boost the apparent amplitude of those high frequency effects. This mapping can be accomplished, for example, by changing the value of the $i_{\omega\psi}$ within the transformation matrix being used. Similarly, phase, duration, and start delay can also be mapped to waveform shape, by changing the terms $i_{\phi\psi}$, $i_{\tau\psi}$, and $i_{\delta\psi}$ in the transformation matrix, respectively.

Signal mode haptic devices, or harmonic haptic devices acting in a "unidirectional" operational mode, provide a force to the body of the housing of the haptic device 124 (e.g., the housing of the interface device 120). In haptic devices that use rotating masses, the force applied to the housing of the haptic device 124 is related to the velocity with which the mass of the haptic device 124 rotates. Specifically, in rotating mass haptic devices 124, the force applied to the housing of the haptic device 124 is directly proportional to the square of the rotational velocity of the mass.

The force of a haptic device using a rotational mass is only perceived by the user above a certain velocity threshold. Thus, until this velocity threshold has been reached, the user does not perceive the force. Hence, a delay exists from the time when an effect instruction first begins to be executed until the user perceives the haptic sensation of the haptic device 124. In the case of a rotating mass haptic device 124, for example, this delay corresponds to the time it takes for the rotating mass to start rotating. This start-up time can be reduced by applying a large voltage for a short duration at the beginning of the haptic instructions. Said another way, a start-up pulse can be applied to the effect instructions received from the application 302 to provide quicker start-up times for haptic sensations provided by the haptic device 124.

Similarly, when haptic sensations are terminated, a delay exists between the time when the effect is commanded to be terminated (e.g., by effect instructions), and the time when the user perceives termination of the haptic sensation. In the case of a rotating mass haptic device 124, for example, this delay corresponds to the time for a rotating mass to completely stop. This delay can be reduced by applying a "braking" pulse of current in the opposite direction of the motion of the rotating mass. A more detailed description of the start-up pulse and the braking pulse is provided in co-pending U.S. application Ser. No. 10/873,643, entitled System and Method for Controlling Haptic Devices Having Multiple Operational Modes, which is incorporated by reference above.

FIG. 5 is a diagram illustrating matrix transformation of effect instructions according to an embodiment of the invention. In FIG. 5, an effect instruction 502 in the form of a sinusoidal drive signal is received by the controller 130 from the application 302 (shown in FIG. 3A). Within the controller, the effect mapper 306 uses three transformation matrices 504, 506, 508 to transform the received effect instructions into transformed effect instructions.

The first transformation matrix $M_i$ 504 is an initiation transformation matrix that transforms the incoming effect instructions to provide initiation transformed effect instructions, such as a lead-in effect or the like. The second matrix $M_s$ 506 is a sustaining transformation matrix that transforms the incoming effect instructions 502 into transformed effect instructions. Specifically, the sustaining matrix 506 provides the middle portion of each of the transformed effect instructions. A third matrix $M_t$ 508 is a termination transformation matrix that transforms the effect instructions into termination transformed effect instructions. For example, the termination matrix 508 may provide such termination effects as a braking pulse, or the like.

Each of the transformed effect instructions created by the effect mapper 306 are provided to the effect combiner/sequencer 308, which sequences the transformed effect instructions so that the each of the initiation transformed effect instructions is first, each of the sustaining transformed effect instructions is second, and each of the termination transformed effect instructions is last. Additionally, where transformed effect instructions from each of the transformation matrices of the effect mapper overlap temporally, those transformed effect instructions are combined by the effect combiner/sequencer 308, such as by superposition, or other suitable method, for example. The controller 130 then outputs haptic instructions, which are produced by the effect combiner/sequencer 308, to the synthesizer/linearizer 304.

Examples of suitable transformation matrices 504, 506, 508 used by the effect mapper 306 to create transformed effect instructions from the received effect instructions 502 are shown in FIGS. 6A, 6B, and 6C, respectively.

FIG. 6A is a diagram illustrating an initiation transformation matrix $M_i$ 504, according to an embodiment of the invention. In the matrix shown in FIG. 6A, the term $i_{\alpha\alpha}$ has a value of 2, which corresponds to an amplitude value that is double the amplitude of the received effect instructions. The value of the term $i_\psi$ is 1, which corresponds to a square wave. Thus, the initiation or lead-in effect provided by way of the initiation matrix $M_i$ 504 involves a square-wave pulse having an amplitude that is twice the amplitude of the received effect instructions. The duration of the effect indicated by the element $i_{\omega\tau}$ is 2, which corresponds to two frequency periods of the received effect instructions. The frequency, phase, and time delay remain unchanged for the initiation matrix 504, as the values of the indices $i_{\omega\omega}$, and $i_{\delta\delta}$ are each 1.

FIG. 6B is a diagram illustrating a sustaining transformation matrix $M_s$ 506, according to an embodiment of the invention. The shape of the received effect instructions 502 remains unchanged as each of the values of the elements $i_{\alpha\alpha}$, $i_{\phi\phi}$, $i_{\omega\omega}$, $i_{\psi\psi}$, $i_{\tau\tau}$, $i_{\delta\delta}$ and $i_{nn}$ along the diagonal of the matrix is 1. The duration of the effect, however, is less than the received effect instructions by four frequency periods, as the value of the index $i_{\omega\tau}$ is −4. Note that two of these periods are used by the initiation transformation matrix $M_i$ 504, and two are used by the termination transformation matrix $M_t$ 508. The transformed effect instruction provided by the sustaining transformation matrix $M_s$ 506 is delayed by two periods of the received effect instructions 502. That is, the transformed effect instructions provided by the sustaining transformation matrix $M_s$ begin only after the two frequency periods of the transformed effect instructions provided by the initiation transformation matrix $M_i$ have passed. Note that the delay inherent in the received effect instructions 502 is accounted for in the value of 1 in the index $i_{\delta\delta}$ of the matrix shown in FIG. 6B.

FIG. 6C is a diagram illustrating a termination transformation matrix $M_t$ 508 used according to an embodiment of the invention. The termination matrix 508 shown in FIG. 6C doubles the magnitude of the received effect instructions 502, as can be seen by the value of 2 for the element $i_{\alpha\alpha}$. Additionally, the waveform is transformed to a square-wave as the value of the $i_\psi$ element is 1. The signal is also inverted, as the value of the phase is set to a −1 in the $i_{\phi\phi}$ element.

The duration of the transformed effect instructions provided by way of the termination transformation matrix $M_t$ 508 is two frequency periods of the received effect instructions 502, as the value of the index $i_{\omega\tau}$ is two. The delay of the transformed effect instructions provided by way of the termination transformation matrix $M_t$ 508 is equivalent to the duration of the received effect instructions 502 (i.e., $i_{\tau\delta}$=1) minus the duration of the termination effect (i.e., $i_{\omega\delta}$=−2) plus the additional delay inherent in the termination effect (i.e., $i_{\delta\delta}$=1).

Thus, if the received effect instructions 502 are a sinusoidal wave, the transformed effect instructions provided by the effect mapper 306 to the effect combiner/sequencer 308 would include a lead-in effect produced by the initiation transformation matrix $M_i$ 504, a sustaining transformed effect instruction produced by the sustaining transformation matrix $M_s$ 506, and a termination transformed effect instruction produced by the termination transformation matrix $M_t$ 508. The haptic instructions output by the controller 130 include a lead-in square-wave signal having double the amplitude of the received effect instructions 502, and having a duration of two periods. The lead-in signal is followed by the sinusoidal signal of the effect instructions beginning after the lead-in signal, and terminating two periods prior to the termination of the received effect instructions 502. The termination signal follows immediately, and includes a square-wave having double the amplitude of the received effect instructions 502, and having an opposite polarity to provide a braking pulse.

According to one or more embodiments of the invention, a lead-in pulse can be used in combination with a sustaining effect. For example, the lead-in effect described in connection with the initiation transformation matrix $M_i$ 504 shown in FIG. 6A can be used to overcome the static coefficient of friction associated with the haptic device 124. The sustaining effect associated with the sustaining transformation matrix $M_s$ 506 described above in connection with FIG. 6B can be used to overcome the kinetic friction within the haptic device 124 (e.g., within the actuator of the haptic device 124). These two effects can be invoked simultaneously by changing the value in the $i_\alpha$ term of the matrix shown in FIG. 6A to one.

Other types of matrices (i.e., other than those shown in FIGS. 5, 6A, 6B, and 6C above) can be used in the system shown in FIG. 5. For example, a wavelet transformation matrix $M_w$ can be used to "gate" effect instructions. In accordance with one or more embodiments that use a harmonic haptic device 124 capable of operating in a harmonic mode, a pulse having a given duration τ can be applied to the resonant haptic device 124, which results in gating the resonant mode actuation of the haptic device 124 for the given duration τ. FIG. 7 is a diagram illustrating a wavelet transformation matrix $M_w$ used according to an embodiment of the invention.

In FIG. 7, the shape of the periodic function used to gate the resonant mode actuation of the haptic device 124 is a sinusoid, as the value of the index $i_\psi$ is sin. The frequency of the wave function is set to the resonant frequency $\omega_r$ of the haptic device 124 (i.e., the $i_\omega$ element=$\omega_r$). The duration of the pulse packet, however, is the same as the commanded pulse duration, such that the value of the $i_{\tau\tau}$ element is 1.

The haptic device 124 can be operated in a low-frequency or unidirectional operational mode. One technique for operating the device in a low-frequency mode is using a pulsed haptic instruction to command a low-frequency haptic sensation. Using such a pulse, the low-frequency effect is mapped to a wavelet at the frequency of the received effect instructions. The duration of the low-frequency effect is mapped to the period between successive wavelets or pulse packets.

FIG. 8 is a diagram illustrating a pulse mode transformation matrix $M_p$ used according to an embodiment of the invention. In the matrix shown in FIG. 8, the last row of the matrix, which allows additional effect parameters to be introduced into the transformation, has several values. Specifically, the frequency of the wave function is set to the resonant frequency $\omega_r$ of the haptic device 124 (i.e., the $i_\omega$ element=$\omega_r$). The duration of the pulse is set to four times the wavelength $\lambda_r$ at the resonant frequency $\omega_r$, and the delay δ is set to a time period of four times the wavelength $\lambda_r$ at the resonant frequency after the initiation of the signal.

Figure 9:
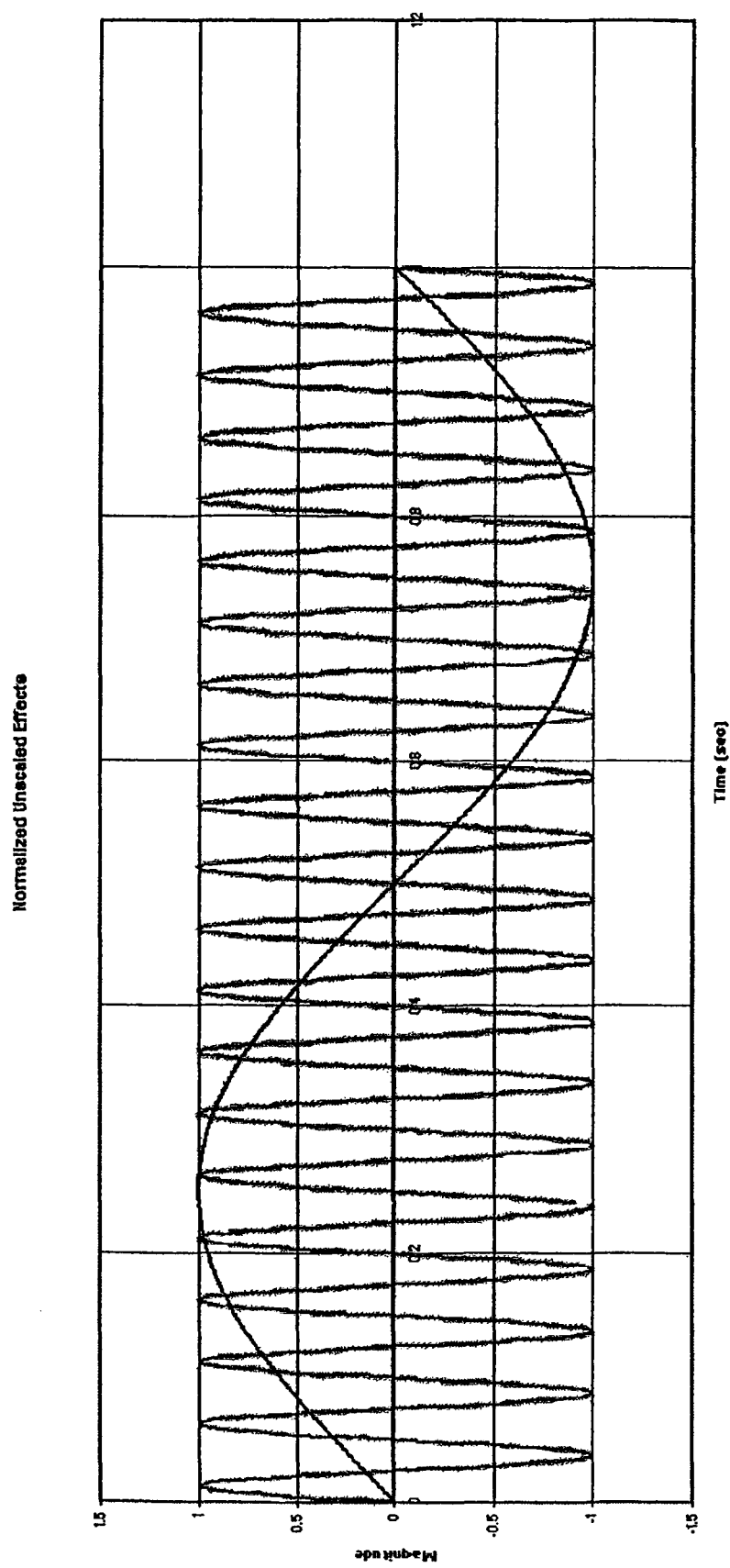
FIG. 9 is a plot showing a desired output frequency and a resonant frequency of a haptic device, according to an embodiment of the invention.

FIG. 9 is a plot showing a desired output frequency and a resonant frequency of a haptic device, according to an embodiment of the invention. More specifically, FIG. 9 illustrates a desired output sinusoidal response having a frequency of approximately 1 Hz superimposed on a higher frequency resonant mode of a harmonic haptic device 124. By using frequency domain envelope modulation, one or more embodiments of the invention can drive such a harmonic haptic device 124 without losing the low-frequency components. This is accomplished by multiplying the low-frequency desired output sinusoidal waveform with the higher frequency resonant mode waveform. The multiplication can be accomplished for example, in real-time. The resulting waveform is shown in FIG. 10.

Figure 10:
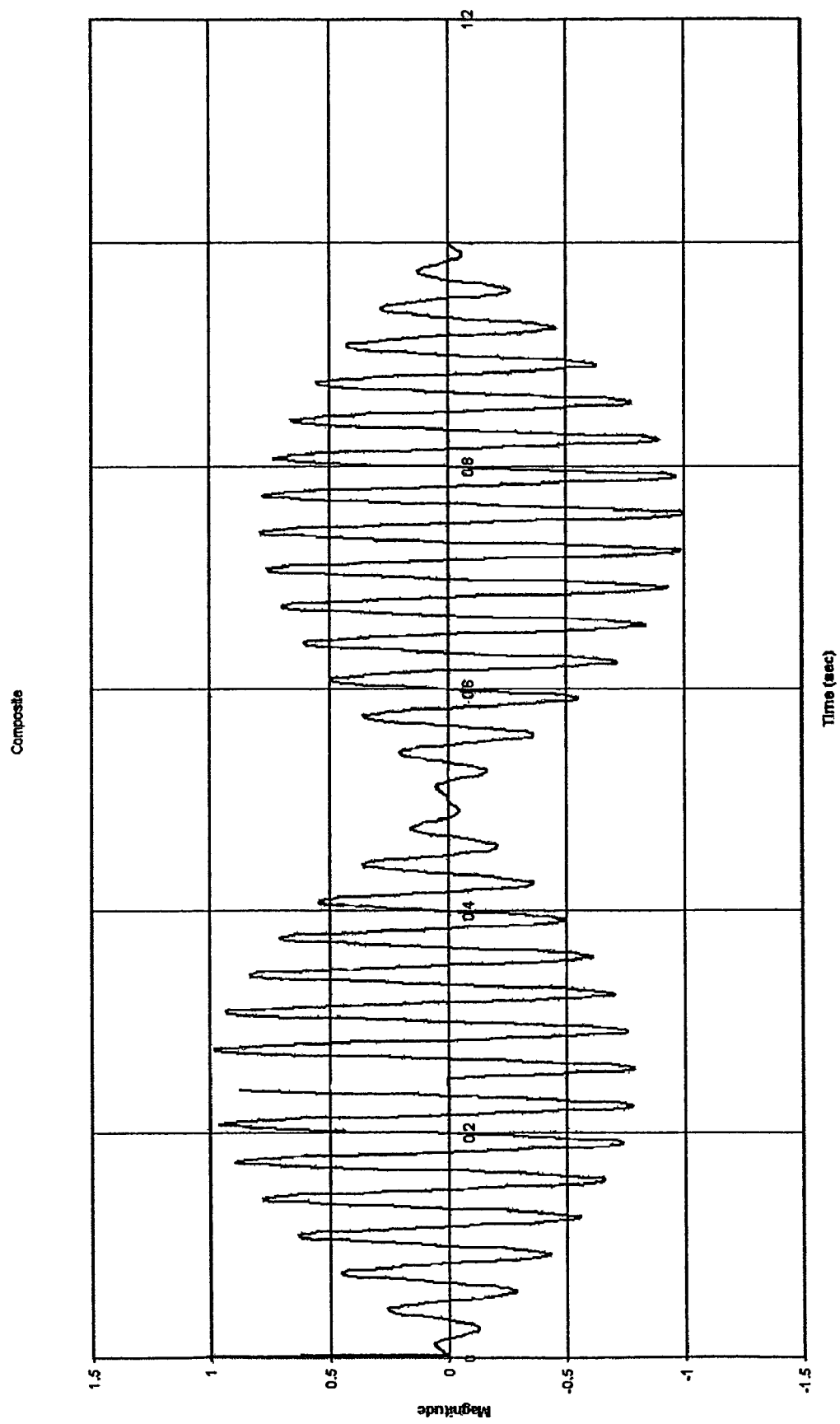
FIG. 10 is a plot showing a modulated signal used to drive a haptic device according to an embodiment of the invention.

FIG. 10 is a plot showing a modulated signal used to drive a haptic device according to an embodiment of the invention. To produce the modulated signal shown in FIG. 10, two matrices $M_1$, $M_2$ shown in FIGS. 11A and 11B, respectively, can be used by the effect mapper.

By using frequency domain envelope modulation, low-frequency and high-frequency filters are used to filter each of the waveforms shown in FIG. 9. The low-frequency signal is then used as an envelope to modulate the high frequency signal, resulting in the plot shown in FIG. 10.

This modulation can be accomplished by operating on the effect vectors in the frequency domain. In the frequency domain, the transformation uses the trigonomic relationship shown below in Equation 6.

$$\sin A \sin B = \frac{1}{2}\cos(A-B) - \frac{1}{2}\cos(A+B) \qquad (6)$$

Using the transformation matrices $M_1$, $M_2$ shown in FIGS. 11A and 11B, respectively, the frequency domain envelope modulation transformation can be accomplished using Equation 7 shown below.

$$\epsilon' = \epsilon M_1 + \epsilon M_2 \quad (7)$$

In Equation 7 above, the effect $\epsilon$ is transformed by the two transformation matrices $M_1$ and $M_2$. The result of the first transformation is modulated with the result of the second transformation (or vice-versa) to produce a modulated effect $\epsilon'$.

The summation step takes place in the effect combiner/sequencer 308 (shown in FIGS. 3B, 3C and 5), and the net effect is an amplitude modulation of the resonant frequency by the frequency of the received effect instructions 502. For example, if the received effect instructions have a square waveform, modulation results in a triangular amplitude modulation of the resonant frequency.

As mentioned above, a harmonic haptic device 124 can operate in two operational modes: a unidirectional operational mode and a harmonic operational mode. Generally speaking, the unidirectional operational mode corresponds to haptic instructions, or drive signals provided to the haptic device 124, that have low frequencies. On the other hand, the harmonic operational mode of a harmonic haptic device 124 generally corresponds to higher frequencies of haptic instructions, or drive signals provided to the haptic device 124. Thus, low frequencies, including direct current (DC) signals could drive the haptic device 124 in the unidirectional mode. A DC signal can be viewed as a signal having zero frequency, or a square wave of an infinite period. To provide smooth transitions between the harmonic operational mode and the unidirectional operational mode, blending between these two operational modes may be desirable.

One technique for blending between a unidirectional operational mode and a harmonic operational mode uses gain functions associated with each of the operational modes. A first gain $G_1$ can be associated with the unidirectional operational mode, and is defined as shown below in Equation 8.

$$G_1 = 1 - \frac{1}{\left(1 + \frac{f}{f_c}\right)} \quad (8)$$

In Equation 8 above, the gain profile of the first gain $G_1$ is defined over a range of frequencies f. At a central frequency $f_c$, or frequency of interest, the value of the first gain $G_1$ is ½. The first gain profile acts as a low-pass filter on the received effect instructions. The frequencies f relate to periodic frequencies $\omega$ by the relationship shown below in Equation 9.

$$f = \frac{\omega}{2\pi} \leftrightarrow \omega = 2\pi f \quad (9)$$

A second gain $G_2$ can be associated with the harmonic operational mode, and it is described in Equation 10 below.

$$G_2 = \frac{1}{\left(1 + \frac{f}{f_c}\right)} \quad (10)$$

At a central frequency $f_c$, or frequency of interest, the value of the second gain $G_2$ is ½. The second gain profile acts as a high-pass filter on the effect instructions.

Figures 12, 13:
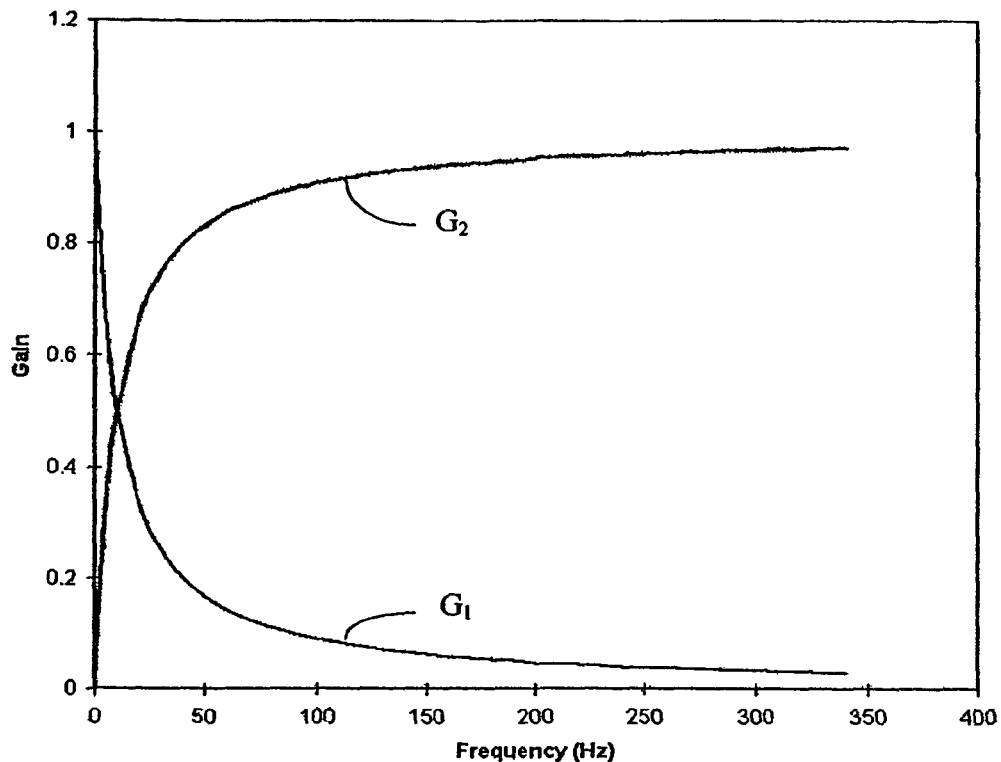
FIG. 12 is a plot showing gains associated with blending functions of multiple operational modes, according to an embodiment of the invention.
FIG. 13 is a diagram illustrating a transformation matrix associated with a blending according to an embodiment of the invention.

FIG. 12 is a plot showing these gains $G_1$, $G_2$ associated with blending functions in each of the multiple operational modes of a harmonic haptic device 124. Although the gain functions shown in FIG. 12 are useful to provide blending between multiple operational modes of a harmonic haptic device 124, other alternative blending functions exist.

In another example, a sinusoidal blending function, such as the one shown below in Equation 11, can be used to blend responses from multiple operational modes of a harmonic haptic device 124.

$$\xi = \cos\left(\frac{\omega}{\omega_r}\right) \quad (11)$$

The blending function shown above in Equation 11 can be obtained using a mapping transformation matrix $M_x$. FIG. 13 is a diagram illustrating a mapping transformation matrix $M_x$, according to an embodiment of the invention. The period of the effect of the function shown in Equation 11 is set to its maximum value represented by $i_\omega = \infty$.

The gain of the unidirectional operational mode is expressed below in Equation 12.

$$\sin\left(\frac{1}{2}\pi\frac{\omega}{\omega_r} + \frac{\pi}{2}\right) = \cos\left(\frac{1}{2}\pi\frac{\omega}{\omega_r}\right) \quad (12)$$

From the foregoing, it can be seen that systems and methods for mapping haptic sensations are discussed. Specific embodiments have been described above in connection with rotating mass haptic devices that use one or more rotating masses to provide vibrotactile feedback. Additionally, specific embodiments have been described in the context of multi-mode haptic devices that have multiple operational modes.

It will be appreciated, however, that embodiments of the invention can be in other specific forms without departing from the spirit or essential characteristics thereof. For example, while some embodiments have been described in the context of rotating mass haptic devices and multi-mode haptic devices, many other types of haptic devices can use the mapping techniques described herein. Additionally, systems and methods of the invention can be useful in any situations where the mapping of received instructions to haptic instructions is desired. The presently disclosed embodiments are, therefore, considered in all respects to be illustrative and not restrictive. Specifically, matrix operations need not specifically use matrix operators but may be reduced to equivalent arithmetic operations.

What is claimed is:

1. A non-transitory processor-readable medium storing instructions for generating consistent haptic effects at a plurality of haptic devices, the instructions when executed by a processor cause the processor to:
   receive an effect instruction, the effect instruction configured to cause a desired haptic effect;
   map the received effect instruction to at least one haptic instruction based on an effect mapping schema and based at least partially on a pre-determined characteristic of a first haptic device, wherein the pre-determined characteristic causes the first haptic device to generate a haptic effect different from the desired haptic effect in response to the effect instruction, and wherein the at least one haptic instruction is different from the effect instruction to account for the pre-determined characteristic to thereby cause the desired haptic effect at the first haptic device in response to the at least one haptic instruction; and transmit at least one haptic signal to the first haptic device, the at least one haptic signal being based on the at least one haptic instruction, wherein the pre-determined characteristic of the first haptic device is a physical characteristic that includes one or more of: a mass, a shape, an acceleration, a deceleration, a resonant frequency, a harmonic mode, a frequency response, an altitude-dependent performance, and an orientation-dependent performance.

2. The non-transitory processor-readable medium of claim 1, wherein the haptic device model corresponds to the first haptic device.

3. The non-transitory processor-readable medium of claim 1, the instructions when executed further cause the processor to:
cause the first haptic device to move in response to the transmitted at least one haptic signal.

4. The non-transitory processor-readable medium of claim 1, the instructions when executed further cause the processor to:
synthesize the at least one haptic instruction in real-time to create at least one synthesized haptic instruction, the at least one haptic signal being based on the at least one synthesized haptic instruction.

5. The non-transitory processor-readable medium of claim 1, the instructions when executed further cause the processor to:
linearize the at least one haptic instruction in real-time to create at least one linearized haptic instruction, the at least one haptic signal being based on the at least one linearized haptic instruction.

6. The non-transitory processor-readable medium of claim 1, the instructions when executed further cause the processor to:
superimpose multiple haptic instructions from the at least one haptic instruction to create at least one superimposed haptic instruction, the at least one haptic signal being based on the at least one superimposed haptic instruction.

7. The non-transitory processor-readable medium of claim 1, the instructions when executed further cause the processor to:
receive a plurality of effect instructions;
select a set of effect instructions from the received plurality of effect instructions; and
map each effect instruction from the selected set of effect instructions to one or more haptic instructions according to an effect mapping schema.

8. The non-transitory processor-readable medium of claim 7, wherein the instructions when executed further cause the processor to map an amplitude of at least one waveform of an at least one effect instruction from the selected set of effect instructions.

9. The non-transitory processor-readable medium of claim 1, wherein the instructions when executed further cause the processor to map at least partially based on a frequency response of the first haptic device.

10. The non-transitory processor-readable medium of claim 1, wherein the instructions when executed further cause the processor to map at least partially based on a friction of the first haptic device.

11. The non-transitory processor-readable medium of claim 1, wherein the instructions when executed further cause the processor to map at least partially based on distortion of at least one waveform of the received effect instruction.

12. The non-transitory processor-readable medium of claim 1, the instructions when executed further cause the processor to:
control the first haptic device using position feedback, wherein the at least one haptic signal is based at least partially on the position feedback.

13. The non-transitory processor-readable medium of claim 1, the instructions when executed further cause the processor to:
control the first haptic device using a peak angular efficiency model, wherein the at least one haptic signal is based at least partially on the peak angular efficiency model.

14. The non-transitory processor-readable medium of claim 1, the processor further configured to:
control the first haptic device using one of force transducer feedback and accelerometer feedback, wherein the at least one haptic signal is based at least partially on the one of the force transducer feedback and accelerometer feedback.

15. The non-transitory processor-readable medium of claim 1, the instructions when executed further cause the processor to:
control the haptic device using torque transducer feedback, wherein the at least one haptic signal is based at least partially on the torque transducer feedback.

16. The non-transitory processor-readable medium of claim 1, the instructions when executed further cause the processor to:
control the haptic device using a ripple torque compensation, wherein the at least one haptic signal is based at least partially on the ripple torque compensation.

17. The non-transitory processor-readable medium of claim 1, the instructions when executed further cause the processor to:
control the haptic device using force vectoring, wherein the at least one haptic signal is based at least partially on the force vectoring.

18. The non-transitory processor-readable medium of claim 1, the instructions when executed further cause the processor to:
control the haptic device using velocity feedback, wherein the at least one haptic signal is based at least partially on the velocity feedback.

19. A non-transitory processor-readable medium storing instructions for generating consistent haptic effects at a plurality of haptic devices each having a pre-determined characteristic that causes the haptic devices to render haptic effects differently from one another, the instructions when executed by a processor cause the processor to:
receive an effect instruction, the effect instruction configured to cause a desired haptic effect;
map the received effect instruction to at least one haptic instruction based on an effect mapping schema and based at least partially on a pre-determined characteristic of a first haptic device, wherein the pre-determined characteristic causes the first haptic device to generate a haptic effect different from the desired haptic effect in response to the effect instruction, wherein the at least one haptic instruction is different from the effect instruction to account for the pre-determined characteristic to cause the desired haptic effect at the first haptic device; and transmit at least one haptic signal to the first haptic device, the at least one haptic signal being based on the at least one haptic instruction.

20. A non-transitory processor-readable medium storing instructions for generating consistent haptic effects at a plurality of haptic devices, the instructions when executed by a processor cause the processor to:

receive an effect instruction, the effect instruction configured to cause a desired haptic effect;

map the received effect instruction to at least one haptic instruction based on an effect mapping schema and based at least partially on a pre-determined characteristic of a haptic device, wherein the at least one haptic instruction is different from the effect instruction to account for the pre-determined characteristic to cause the desired haptic effect at the haptic device; and transmit at least one haptic signal to the haptic device, the at least one haptic signal being based on the at least one haptic instruction, wherein the processor is further configured to modify a shape of a waveform of the at least one haptic instruction to produce at least one modified haptic instruction, an output of the haptic device being associated with the at least one modified haptic instruction.

21. An apparatus, comprising:
a controller configured to receive effect instructions from at least one application, the effect instructions configured to cause desired haptic effects, the controller including an effect mapper, the effect mapper being configured to produce a plurality of haptic instructions in response to at least a portion of the received effect instructions, the haptic instructions being at least partially based on a physical characteristic of a haptic device, wherein the plurality of haptic instructions are different from corresponding effect instructions to account for the physical characteristic to cause the desired haptic effects at the apparatus,
wherein the physical characteristic includes one or more of: a mass, a shape, an acceleration, a deceleration, a resonant frequency, a harmonic mode, a frequency response, an altitude-dependent performance, and an orientation-dependent performance.

22. The apparatus of claim 21, further comprising:
a synthesizer in communication with the effect mapper, the synthesizer being configured to synthesize the plurality of haptic instructions to produce a plurality of synthesized haptic signals.

23. The apparatus of claim 21, further comprising:
a synthesizer in communication with the effect mapper, the synthesizer being configured to synthesize the plurality of haptic instructions to produce a plurality of synthesized haptic signals, the synthesized haptic signals being configured to cause a haptic device to generate haptic sensations.

24. The apparatus of claim 21, further comprising:
a synthesizer in communication with the effect mapper, the synthesizer being configured to synthesize the plurality of haptic instructions in real-time to produce a plurality of synthesized haptic signals, the synthesized haptic signals being configured to cause a haptic device to generate haptic sensations.

25. The apparatus of claim 21, further comprising:
a synthesizer in communication with the effect mapper, the synthesizer being configured to synthesize the plurality of haptic instructions to produce a plurality of synthesized haptic signals, the synthesized haptic signals being configured to cause a haptic device to generate haptic sensations; and
a haptic device in communication with the synthesizer, the haptic device being configured to receive the plurality of synthesized haptic signals.

26. The apparatus of claim 21, wherein the controller includes the effect mapper.

27. The apparatus of claim 21, wherein the effect mapper is configured to modify the effect instructions received by the controller to produce the haptic instructions.

28. The apparatus of claim 27, wherein the controller is configured to pre-filter the received effect instructions.

29. The apparatus of claim 21, wherein the effect mapper is configured to select a set of the effect instructions received by the controller.

30. The apparatus of claim 21, wherein the controller is further configured to modify the plurality of haptic instructions produced by the effect mapper.

31. The apparatus of claim 21, further comprising:
an effect combiner in communication with the effect mapper, the effect combiner configured to superimpose the plurality of haptic instructions produced by the effect mapper to form superimposed haptic instructions.

32. The apparatus of claim 21, further comprising:
an effect combiner in communication with the effect mapper, the effect combiner configured to superimpose the received effect instructions to form superimposed effect instructions, the effect combiner being further configured to communicate the superimposed effect instructions to the effect mapper.

33. The apparatus of claim 21, further comprising:
an effect combiner in communication with the effect mapper, the effect combiner configured to normalize the received effect instructions to form normalized effect instructions, the effect combiner being further configured to communicate the normalized effect instructions to the effect mapper.

34. The apparatus of claim 21, further comprising:
a linearizer in communication with the controller, the linearizer being configured to linearize the haptic instructions to produce linearized haptic instructions.

35. The apparatus of claim 21, wherein the controller includes a switching controller.

36. An apparatus, comprising:
a controller configured to receive effect instructions from at least one application, the controller including an effect mapper, the effect instructions configured to cause desired haptic effects, the effect mapper being configured to produce a plurality of haptic instructions in response to at least a portion of the received effect instructions, the haptic instructions being at least partially based on a physical characteristic of a haptic device, wherein the plurality of haptic instructions are different from corresponding effect instructions to cause the desired haptic effects at the apparatus to account for the physical characteristics,
wherein the effect mapper uses values stored in a matrix to map each of the received effect instructions to at least one of the plurality of haptic instructions.

37. An apparatus, comprising:
a controller configured to receive effect instructions from at least one application, the controller including an effect mapper, the effect instructions configured to cause desired haptic effects, the effect mapper being configured to produce a plurality of haptic instructions in response to at least a portion of the received effect instructions, the haptic instructions being at least partially based on a physical characteristic of a haptic device, wherein the plurality of haptic instructions are different from corresponding ones of the effect instructions to account for the physical characteristic to cause the desired haptic effect at the apparatus, wherein the effect mapper uses values stored in a plurality of matrices to map each of the received effect instructions to at least one of the plurality of haptic instructions.

38. An apparatus, comprising:
a controller configured to receive a plurality of effect instructions, the controller including an effect mapper, the plurality of effect instructions configured to cause desired haptic effects, the effect mapper configured to receive the plurality of effect instructions and to produce a plurality of haptic instructions based on at least one pre-determined parameter, the at least one pre-determined parameter being associated with at least one physical characteristic of a haptic device configured to execute the plurality of haptic instructions, wherein the plurality of haptic instructions are different from corresponding effect instructions to account for the at least one pre-determined parameter to cause the desired haptic effects at the apparatus; and
a linearizer in communication with the effect mapper, the linearizer configured to modify at least one haptic instruction from the plurality of haptic instructions,
wherein the physical characteristic includes one or more of: a mass, a shape, an acceleration, a deceleration, a resonant frequency, a harmonic mode, a frequency response, an altitude-dependent performance, and an orientation-dependent performance.

39. The apparatus of claim 38, wherein the linearizer is configured to modify in real-time at least one haptic instruction from the plurality of haptic instructions.

40. The apparatus of claim 38, further comprising:
a synthesizer in communication with the effect mapper, the synthesizer being configured to synthesize the plurality of haptic instructions to produce a plurality of synthesized haptic signals.

41. The apparatus of claim 38, further comprising:
a synthesizer in communication with the effect mapper, the synthesizer being configured to synthesize the plurality of haptic instructions in real-time to produce a plurality of synthesized haptic signals.

42. The apparatus of claim 38, further comprising:
a synthesizer in communication with the effect mapper, the synthesizer being configured to synthesize the plurality of haptic instructions to produce a plurality of synthesized haptic signals; and
a haptic device in communication with the synthesizer, the haptic device being configured to receive the plurality of synthesized haptic signals.

43. The apparatus of claim 38, wherein the controller includes the effect mapper.

44. The apparatus of claim 38, wherein the effect mapper is configured to modify the plurality of effect instructions received by the controller to produce the haptic instructions.

45. The apparatus of claim 44, wherein the controller is configured to pre-filter the plurality of received effect instructions.

46. The apparatus of claim 38, wherein the effect mapper is further configured to select a set from the plurality of effect instructions.

47. The apparatus of claim 38, wherein the controller is further configured to modify the plurality of haptic instructions produced by the effect mapper.

48. The apparatus of claim 38, further comprising:
an effect combiner in communication with the effect mapper, the effect combiner being configured to superimpose the received plurality of effect instructions.

49. The apparatus of claim 38, further comprising:
an effect combiner in communication with the effect mapper, the effect combiner configured to superimpose the plurality of haptic instructions produced by the effect mapper to form superimposed haptic instructions.

50. The apparatus of claim 38, further comprising:
an effect combiner in communication with the effect mapper, the effect combiner configured to superimpose the plurality of received effect instructions to form superimposed effect instructions, the effect combiner being further configured to communicate the superimposed effect instructions to the effect mapper.

51. The apparatus of claim 38, further comprising an effect combiner in communication with the effect mapper, the effect combiner configured to normalize the received plurality of effect instructions to form normalized effect instructions, the effect combiner being further configured to communicate the normalized effect instructions to the effect mapper.

52. The apparatus of claim 38, wherein the controller includes a switching controller.

53. An apparatus, comprising:
a controller configured to receive a plurality of effect instructions, the plurality of effect instructions configured to cause desired haptic effects, the controller including an effect mapper, the effect mapper configured to receive the plurality of effect instructions and to produce a plurality of haptic instructions based on at least one pre-determined parameter, the at least one pre-determined parameter being associated with at least one physical characteristic of a haptic device configured to execute the plurality of haptic instructions, wherein the plurality of haptic instructions are different from corresponding effect instructions to account for the at least one pre-determined parameter to cause the desired haptic effects at the apparatus; and
a linearizer in communication with the effect mapper, the linearizer configured to modify at least one haptic instruction from the plurality of haptic instructions,
wherein the effect mapper uses values stored in a matrix to map each of the received plurality of effect instructions to at least one of the plurality of haptic instructions.

54. An apparatus, comprising:
a controller configured to receive a plurality of effect instructions, the plurality of effect instructions configured to cause desired haptic effects, the controller including an effect mapper, the effect mapper configured to receive the plurality of effect instructions and to produce a plurality of haptic instructions based on at least one pre-determined parameter, the at least one pre-determined parameter being associated with at least one physical characteristic of a haptic device configured to execute the plurality of haptic instructions, wherein the plurality of haptic instructions are different from corresponding effect instructions to account for the at least one pre-determined parameter to cause the desired haptic effects at the apparatus; and
a linearizer in communication with the effect mapper, the linearizer configured to modify at least one haptic instruction from the plurality of haptic instructions,
wherein the effect mapper uses values stored in a plurality of matrices to map each of the received effect instructions to at least one of the plurality of haptic instructions.

55. A method comprising;
receiving an effect instruction, the effect instruction configured to cause a desired haptic effect;
mapping the received effect instruction to at least one haptic instruction based on an effect mapping schema, the mapping being based at least partially on a pre-determined characteristic of a haptic device, wherein the at least one haptic instruction is different from the effect instruction to account for the pre-determined characteristic to cause the desired haptic effect at the haptic device; and
transmitting at least one haptic signal to the haptic device, the at least one haptic signal being based on the at least one haptic instruction,
wherein the pre-determined characteristic of the haptic device is a physical characteristic that includes one or more of: a mass, a shape, an acceleration, a deceleration, a resonant frequency, a harmonic mode, a frequency response, an altitude-dependent performance, and an orientation-dependent performance.

56. The method of claim 55, wherein the haptic device model corresponds to the first haptic device.

57. The method of claim 55, further comprising:
causing the haptic device to move in response to the transmitted at least one haptic signal.

58. The method of claim 55, further comprising:
synthesizing the at least one haptic instruction in substantially real-time to create at least one synthesized haptic instruction, the at least one haptic signal being based on the at least one synthesized haptic instruction.

59. The method of claim 55, further comprising:
linearizing the at least one haptic instruction in substantially real-time to create at least one linearized haptic instruction, the at least one haptic signal being based on the at least one linearized haptic instruction.

60. The method of claim 55, further comprising:
superimposing multiple haptic instructions from the at least one haptic instruction to produce at least one superimposed haptic instruction, the at least one haptic signal being based on the at least one superimposed haptic instruction.

61. The method of claim 55, further comprising:
receiving a plurality of effect instructions;
selecting a set of effect instructions from the received plurality of effect instructions; and
mapping each effect instruction from the selected set of effect instructions to at least one haptic instruction according to an effect mapping schema.

62. The method of claim 61, wherein the mapping includes:
associating each effect instruction from the selected set of effect instructions to at least one haptic instruction via a pre-defined matrix relationship.

63. The method of claim 61, wherein the mapping includes:
mapping an amplitude of at least one waveform of an effect instruction from the selected set of effect instructions.

64. The method of claim 55, wherein the mapping is at least partially based on a frequency response of the haptic device.

65. The method of claim 55, wherein the mapping is at least partially based on a friction of the haptic device.

66. The method of claim 55, wherein the mapping is at least partially based on distortion of at least one waveform of the received effect instruction.

67. The method of claim 55, wherein the mapping includes:
modifying a shape of a waveform of the at least one haptic instruction to produce at least one modified haptic instruction, an output of the haptic device being associated with the at least one modified haptic instruction.

68. The method of claim 55, further comprising:
controlling the haptic device using position feedback, the transmitting at least one force instruction being based partially on the position feedback.

69. The method of claim 55, further comprising:
controlling the haptic device using a peak angular efficiency model, the transmitting at least one force instruction being based partially on the peak angular efficiency model.

70. The method of claim 55, further comprising:
controlling the haptic device using one of force feedback and accelerometer feedback, the transmitting at least one force instruction being based partially on the one of the force feedback and the accelerometer feedback.

71. The method of claim 55, further comprising:
controlling the haptic device using torque feedback, the transmitting at least one force instruction being based partially on the torque feedback.

72. The method of claim 55, further comprising:
controlling the haptic device using a ripple torque compensation, the transmitting at least one force instruction being based partially on the ripple torque compensation.

73. The method of claim 55, further comprising:
controlling the haptic device using force vectoring, the transmitting at least one force instruction being based partially on the force vectoring.

74. The method of claim 55, further comprising:
controlling the haptic device using velocity feedback, the transmitting at least one force instruction being based partially on the velocity feedback.

* * * * *